US009350402B1

(12) United States Patent
Corbalis et al.

(10) Patent No.: US 9,350,402 B1
(45) Date of Patent: May 24, 2016

(54) WIDEBAND BEAMFORMER SYSTEM

(71) Applicant: Leidos, Inc., Reston, VA (US)

(72) Inventors: Leo James Corbalis, Woodbine, MD (US); David Scott Illar, Ellicott City, MD (US)

(73) Assignee: Leidos, Inc., Reston, VA (US)

( * ) Notice: Subject to any disclaimer, the term of this patent is extended or adjusted under 35 U.S.C. 154(b) by 51 days.

(21) Appl. No.: 14/519,202

(22) Filed: Oct. 21, 2014

Related U.S. Application Data

(60) Provisional application No. 61/893,701, filed on Oct. 21, 2013.

(51) Int. Cl.
*H04B 7/08* (2006.01)
*H04B 1/12* (2006.01)

(52) U.S. Cl.
CPC . *H04B 1/123* (2013.01); *H04B 7/08* (2013.01)

(58) Field of Classification Search
CPC ............ H04B 1/30; H04B 1/325; H04B 7/08; H04B 7/15542; H04B 7/15571; H04M 1/00
See application file for complete search history.

(56) References Cited

U.S. PATENT DOCUMENTS

| | | | | |
|---|---|---|---|---|
| 7,187,907 | B2* | 3/2007 | Widrow | H04L 5/14 455/282 |
| 8,952,844 | B1* | 2/2015 | Wasiewicz | H04L 25/03019 342/159 |
| 2003/0031243 | A1* | 2/2003 | Meehan | H04B 7/0845 375/233 |
| 2008/0225931 | A1* | 9/2008 | Proctor | H04B 7/15542 375/214 |
| 2010/0241426 | A1* | 9/2010 | Zhang | G10L 21/0208 704/226 |

OTHER PUBLICATIONS

Xuan Nam Tran, et al., "Subband Adaptive Array for DS-CDMA Mobile Radio," EURASIP Journal on Applied Signal Processing, 2004:3, pp. 418-426.
Jahangir Dadkhah Chimeh, et al., "Sub-Band Beamforming of OFDM Signals in Time Varying Multi-Path Fading Channel," 2005 IEEE International Symposium on Signal Processing and Information Technology, 2005, pp. 451-453.
Stephan Weiss, et al., "An Efficient Scheme for Broadband Adaptive Beamforming," IEEE, 1999, pp. 496-500.
Ben Mathews, et al., "Wideband Radar Adaptive Beamforming Using Frequency-Domain Derivative Based Updating," SDR Forum Technical Conference, 2007, 6 pp.
Zhang, et al., "Adaptive Array Processing for Multipath Fading Mitigation via Exploitation of Filter Banks," IEEE Trans. Antennas and Propagation, vol. 49, No. 4, 2001, 12 pp.
Shynk, J., "Frequency-Domain and Multirate Adaptive Filtering," IEEE SP Magazine, 1992, 24 pp.

* cited by examiner

*Primary Examiner* — Thanh Le
(74) *Attorney, Agent, or Firm* — Dawn-Marie Bey; Bey & Cotropia PLLC

(57) ABSTRACT

An adaptive phased-array processing solution, referred to as the Wideband Beamformer System (WBS), demonstrates an improvement in the range and quality of air link surveillance downlink wireless cell radio signals. The WBS applies wideband frequency-domain adaptive beamforming to preprocess the dense RF signal environment, minimizing co-channel interference (CCI) from each signal, and then reconstructing a "clean" version of the signal for input to the existing surveillance receiver(s).

5 Claims, 26 Drawing Sheets

Survey Results

| | Cell ID | F-PICH SNIR (dB) | F-SYNC SNIR (dB) | Range (km) | LOB (deg) | Assign to Output |
|---|---|---|---|---|---|---|
| | 084 | 23.6 | 24.6 | 1.2 | 28.0 | ☐ |
| | 404 | 25.2 | 25.3 | 1.3 | 178.0 | ☐ |
| | 024 | 11.7 | 11.3 | 3.0 | 87.3 | ☐ |
| | 420 | 14.0 | 14.9 | 3.9 | 123.1 | ☐ |
| | 408 | 0.1 | 0.0 | 5.0 | 102.5 | ☐ |
| | 088 | 10.9 | 20.1 | 5.0 | 172.3 | ☐ |
| | 460 | 8.3 | 9.9 | 6.8 | 95.7 | ☐ |
| | 460 | 10.8 | 17.1 | 8.1 | 151.2 | ☐ |
| | 234 | 0.1 | 9.2 | 8.2 | 92.3 | ☐ |
| | 384 | 10.8 | 0.9 | 7.2 | -117.1 | ☐ |
| | 072 | 11.0 | 11.2 | 8.8 | 166.0 | ☐ |
| | 340 | 12.7 | 13.1 | 10.1 | 101.0 | ☐ |

| Active CNs |
|---|
| 384 |

Results ← 410

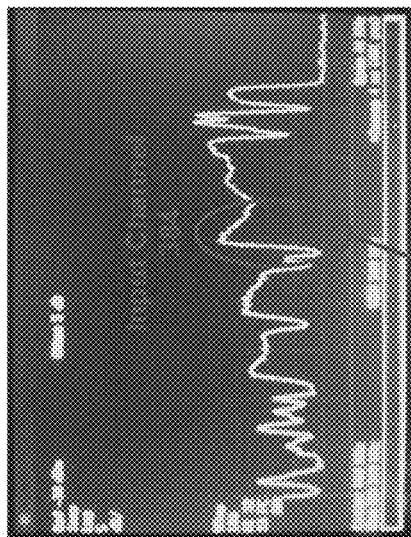
FIGURE 10c
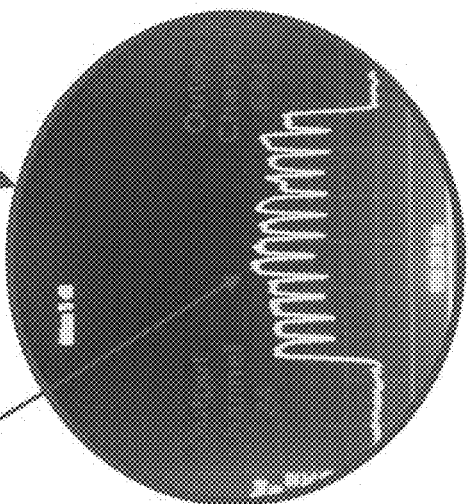
FIGURE 10d
FIGURE 10b

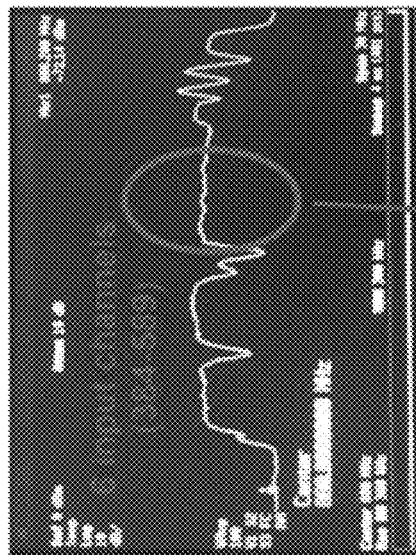
FIGURE 11c
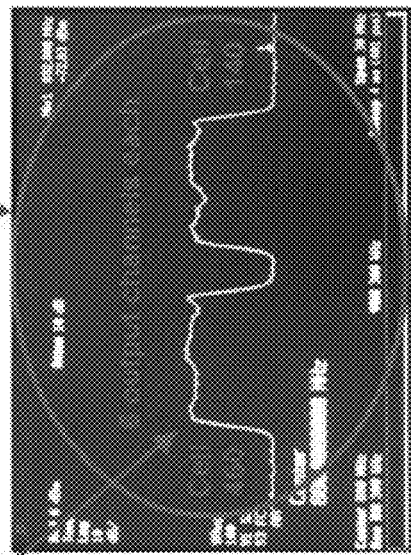
FIGURE 11d
FIGURE 11b

WIDEBAND BEAMFORMER SYSTEM

CROSS-REFERENCE TO RELATED APPLICATIONS

The present application claims the benefit of priority to similarly titled U.S. Provisional Patent Application No. 61/893,701 filed Oct. 21, 2013, the contents of which is incorporated herein by reference in its entirety.

BACKGROUND OF THE EMBODIMENTS

1. Field of the Embodiments

The embodiments described and illustrated herein are directed to a tool for improving the surveillance performance of wireless receivers in dense co-channel signal environments. The tool is agnostic in that it is able to integrate directly with existing surveillance receiver equipment.

2. Description of the Related Art

The advent of advanced third and fourth generation (3G/4G) wireless cellular and local area network (LAN) radio technology represents a new challenge to lawful electronic surveillance and reconnaissance activities. These new generation radios employ sophisticated waveforms, multichannel processing (MIMO) and powerful error correction coding to maximize reuse of the frequency spectrum while minimizing radio link power between mobile devices and the serving cell transceivers. The resulting dense co-channel interference (CCI) environment prevents all but the closest cell sites from being reliably received by conventional surveillance receivers. Since the cell coverage from a single tower is typically only a 1 to 2 km range, this significantly impacts the available surveillance range. Further, the signals from the distant cell transmitters also interfere with the nearby cell tower signal, reducing its received signal quality as well. This prevents reliable reception of a cell transmitting from the same tower, and also from the sector pointed away from the receiver's location. An adversary can be in close proximity—on the far side of the tower—but remain undetected. Such limitations hamper military, law enforcement and other sensitive operations.

Lawful electronic surveillance operations currently use directional antennas to combat co-channel interference and extend the surveillance range to target cells site transmitters. Two types of directional antenna technologies are used: log-periodic and parabolic reflector (i.e., dish, grid), each optimized for one or more standard wireless frequency bands.

Log periodic (LP) antennas can cover multiple frequency bands simultaneously, so only a single antenna needs to be installed. However, the LP antenna's main beam is generally too broad to be effective in urban/light-urban terrains which have dozens of cell sites lying within the beam.

Parabolic reflector (PR) antennas have had greater success in reducing the co-channel interference background owing to their narrower beam widths. To achieve the narrower beam the PR antennas must be relatively large (~1 meter diameter) and cover a single operating frequency. Multiple antennas are required to cover standard cell bands, and each must be mechanically steered to each desired cell site in turn. PR antennas will cease to be effective however as the new 4G/LAN technology—LTE, 802.11n, advanced 3G—replace earlier 2G/3G and Wi-Fi formats. Stand-off surveillance of these signals will require multiple antenna elements, spaced within a few wavelengths of each other. A PR antenna cannot achieve this inter-element spacing without widening its beam width, eliminating its CCI mitigation performance.

Accordingly, there remains a need in the art for a system and method for addressing CCI and improving the range and quality of electronic surveillance of wireless cell radio signals across varying terrains and cell site densities.

SUMMARY OF THE EMBODIMENTS

The present embodiments are directed to an adaptive phased-array processing solution, referred to as the Wideband Beamformer System (WBS), which has demonstrated a 10:1 improvement in the range and quality of air link surveillance downlink wireless cell radio signals. The WBS applies wideband frequency-domain adaptive beamforming which preprocesses the dense RF signal environment, minimizing the CCI from each signal, and then reconstructing a "clean" version of the signal for input to the existing surveillance receiver(s).

The embodiments combine broadband frequency-domain phased-array processing with recent technology advances in miniaturized receivers and fully programmable gate arrays (FPGAs) to realize a low SWAP, cost effective solution tailored to forward deployed, fixed and mobile, including airborne, surveillance requirements.

More particularly, a first embodiment is directed to a process for improving the quality of received radio frequency signals. The process includes: receiving multiple tuned input signals at a subband adaptive filter, wherein the multiple tuned input signals are derived from multiple overlapping wideband radio frequency emitter signals emitted from multiple transmitters, decomposing by multiple channelizers the multiple tuned input signals into individual channel signals and providing individual channel signal data to a weighting algorithm module; providing by the weighting algorithm module individualized weighted filter data for each of the individual channel signals in accordance with the individual channel signal data to an adaptive beamformer filter module; supplying by the adaptive beamformer filter module the individualized weighted filter data to multiple subband beamformer combiners for application to each of the individual channel signals; reconstructing by the subband adaptive filter the filtered individual channel signals and providing filtered individual channel output signals to a one or more receivers; and receiving the filtered individual channel output signals at designated channels of the one or more receivers.

A second embodiment is directed to system for improving the quality of reception of multiple overlapping radio frequency input signals emitted from multiple transmitters. The system includes at least one subband adaptive filter including multiple channelizers for decomposing the multiple overlapping radio frequency input signals into individual channel signals, a buffer for extracting individual channel signal data, an adaptive beamformer filter module, multiple subband beamformer combiners, multiple synthesizers; and a weighting algorithm module, wherein the weighting algorithm module receives the individual channel signal data from the buffer and provides individualized weighted filter data to the adaptive beamformer filter module responsive thereto; and further wherein the adaptive beamformer filter module provides the individualized weighted filter data to the multiple subband beamformer combiners for application to the individual channel signals.

A third embodiment is directed to process for synthesizing an individual antenna beam pattern to each individual cellular transmitter within a predetermined cellular band to a receiving antenna to optimize signal-to-noise (SNR) of emitted transmitter signals therefrom. The process includes: scanning a predetermined cellular band and constructing a database of individual cellular transmitters emitting signals at or above the predetermined threshold; electronically steering a high gain antenna beam main lobe at each individual cellular transmitter emitting a signal at or above a predetermined threshold; and simultaneously directing antenna nulls in the direction of individual cellular transmitters interfering with each of the other individual cellular transmitters within the predetermined cellular band.

BRIEF SUMMARY OF THE FIGURES

The Summary of the Embodiments, as well as the following Detailed Description, is best understood when read in conjunction with the following exemplary drawings:

FIGS. 7a-7d are exemplary dialog boxes for illustrating the scanning process outputs from the WBS processing in accordance with one or more embodiments described herein;

FIGS. 10a-10d are exemplary dialog boxes illustrating specific scanning and beamforming results from the WBS processing in accordance with a first specific exemplary embodiment;

FIGS. 11a-11d are exemplary dialog boxes illustrating specific scanning and beamforming results from the WBS processing in accordance with a second specific exemplary embodiment;

DETAILED DESCRIPTION

Figure 1:
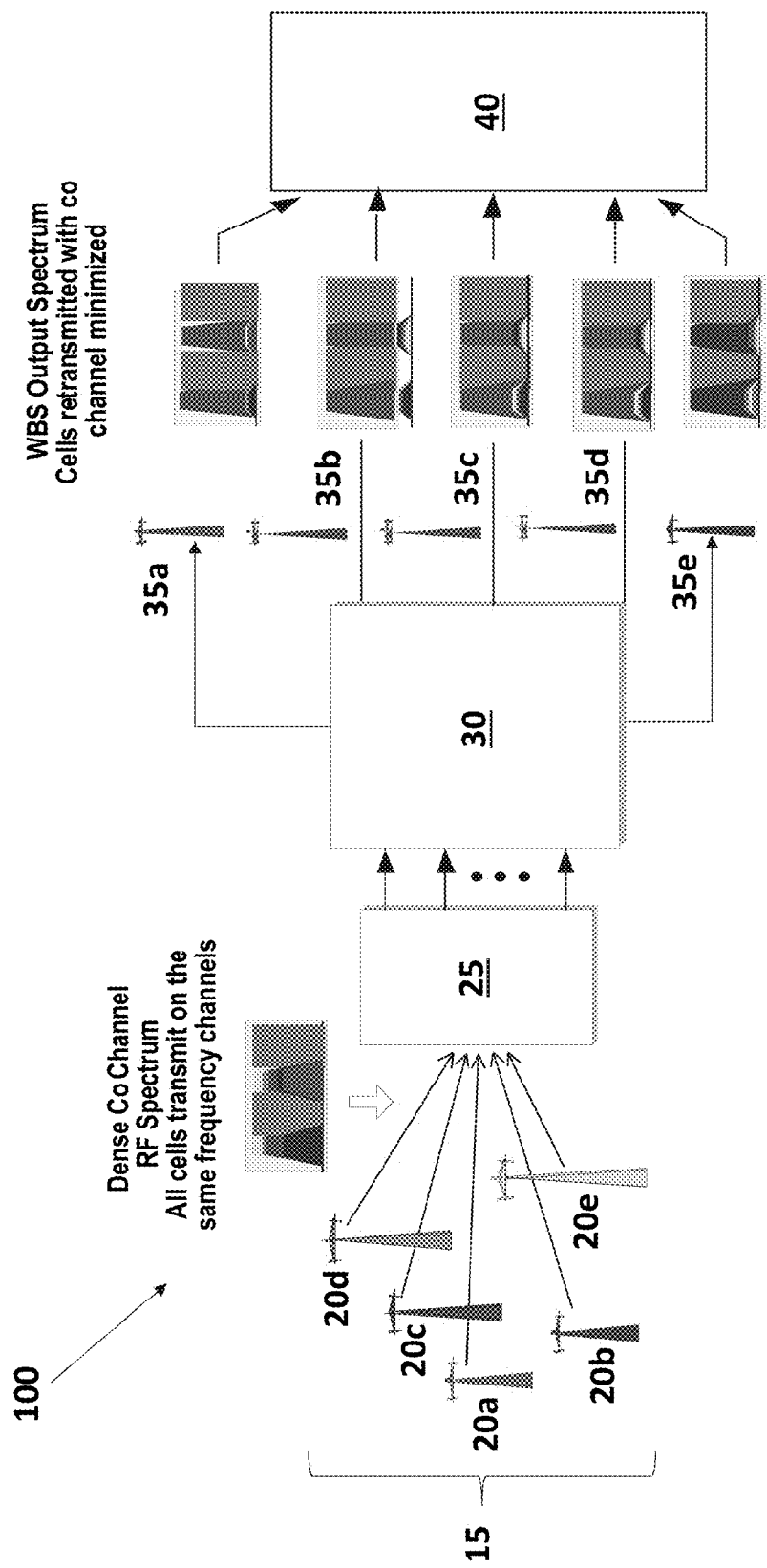
FIG. 1 is a schematic of an exemplary transmitter and receiver scenario, including a wide beamforming system (WBS) in accordance with one or more embodiments described herein.

Referring to FIG. 1, a conceptual schematic of a WBS 100 in accordance with a preferred embodiment is shown. FIG. 1 illustrates a representative co-channel environment 15 with multiple individual cell transmitters (hereafter "cell sites") 20a-20e. The varying vertical height of each cell transmitter is intended to denote its received signal strength at the input to the antenna array 25, with the closest tower 20e being the strongest. In a conventional (prior art) single input surveillance receiver, the strongest signal masks those emanating from the more distant cells (i.e., near-far phenomenon). Without additional processing only the closest cells are recoverable, typically no more than 1 km standoff. The input to the antennae array is a dense co-channel RF spectrum wherein all cells are transmitting on the same frequency channels.

In accordance with the preferred embodiment, the WBS uses phased-array processing to synthesize a unique antenna beam pattern to each individual cell site (tower transmitter) to optimize its signal-to-noise (SNR) ahead of the signal demodulators. This is accomplished by electronically steering a high gain antenna beam main lobe at the cell cite, while simultaneously directing antenna nulls towards high powered interfering cells/towers. Using wideband frequency domain techniques in a wideband adaptive beamformer 30, the signals from multiple cells are isolated, and individually beam formed to attenuate the CCI from its neighbor cells. The resultant cell site signals 35a-35e are then reconstructed and output to one or more downstream surveillance receivers 40 for processing. The use of wideband beamforming enables the WBS to isolate all frequency channels for multiple cell sites simultaneously.

Additionally, the WBS described herein also includes at least the following additional capabilities and advantages. The WBS interfaces with existing site receivers, i.e., the reconstructed wideband signals 35a-35e interface directly to legacy wireless surveillance receivers 40, using e.g., RF or 10 GigE/Vita 49 formatted digital data. The WBS supports high capacity output (as needed) with the ability to isolate and output multiple cell channels using frequency stacking; supporting beamforming and output of up to 48 CDMA2000 channels. The WBS architecture supports multiple wireless signal formats and is currently programmed for, but not limited, 3GPP2 CDMA2000 1×RTT and EVDO cell standards. Additionally, the WBS architecture supports adaptive beamforming for all modern cell and LAN radio formatted signals with only software modifications: i.e., GSM, TD-SCDMA, W-CDMA, LTE, 802.16e WiMAX and 802.11a/g/n Wi-Fi. The WBS employs signal referenced beamforming as compared to prior art subspace direction of arrival (DOA) solutions. The beamforming solutions are trained on reference sub-channels imbedded in the signal format; the number of signals that can be received is not limited by the number of antennas in the array. The WBS supports ad hoc and standard antenna array topologies. That is the beamforming is array-agnostic, compatible with a wide variety of standard or ad hoc antenna array topologies. Further, antenna arrays and RF distribution do not require calibration. Further still, the WBS supports external direction finding (DF) and geo-location. The WBS beamforming solutions, receiver calibration and raw data snapshots can assist in DF and geo-location of co-channel transmitters. The data collects are GPS time stamped to support Time-of-Flight (TOF) and Time-Difference-of-Arrival (TDOA) geo-location methods.

In contrast with prior art solutions, instead of pointing a single narrow antenna beam at a desired cell, the WBS synthesizes multiple nulls in the antenna pattern towards strong interfering cells, while constraining the main lobe to point at the desired cell. The phased-array algorithm independently optimizes the antenna pattern for each desired cell to maximize the signal quality against the interference background.

Multiple cells can be monitored simultaneously. The LP and PR antennas described in the Description of the Related Art must be physically large to achieve a narrow beam width. Whereas the phased-arrays of the present embodiments can be built using low gain antennas which are smaller and lower cost. Further, a phased array is easily customized with additional antenna elements, dual polarized elements, and wider aperture to achieve the CCI and spatial diversity performance needed to operate against new 4G/LAN signals.

Figure 2A:
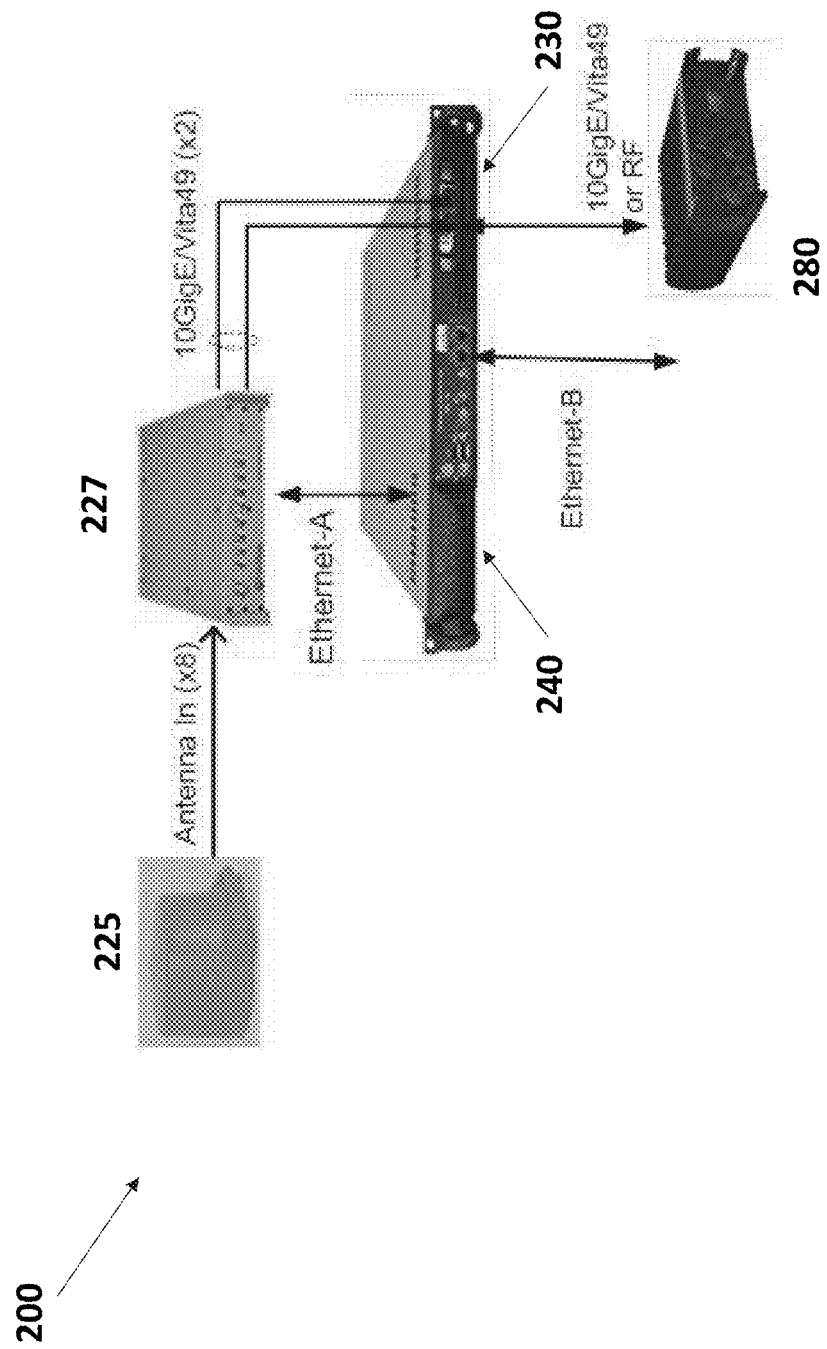
FIGS. 2a-2c illustrates exemplary hardware and data flow connections which may be used to implement a WBS in accordance with one or more embodiments described herein.
Figure 2B:
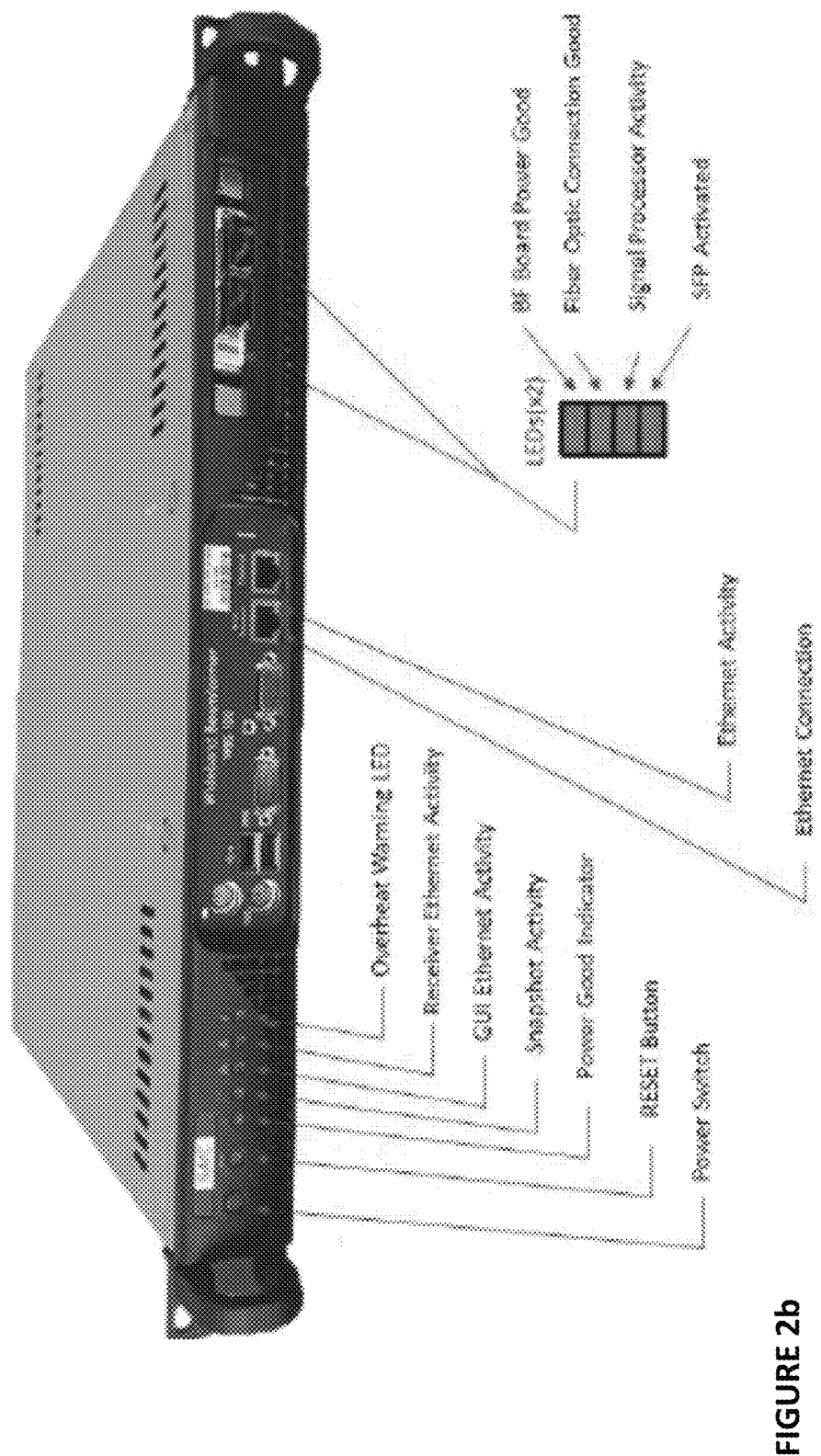
Figure 2C:
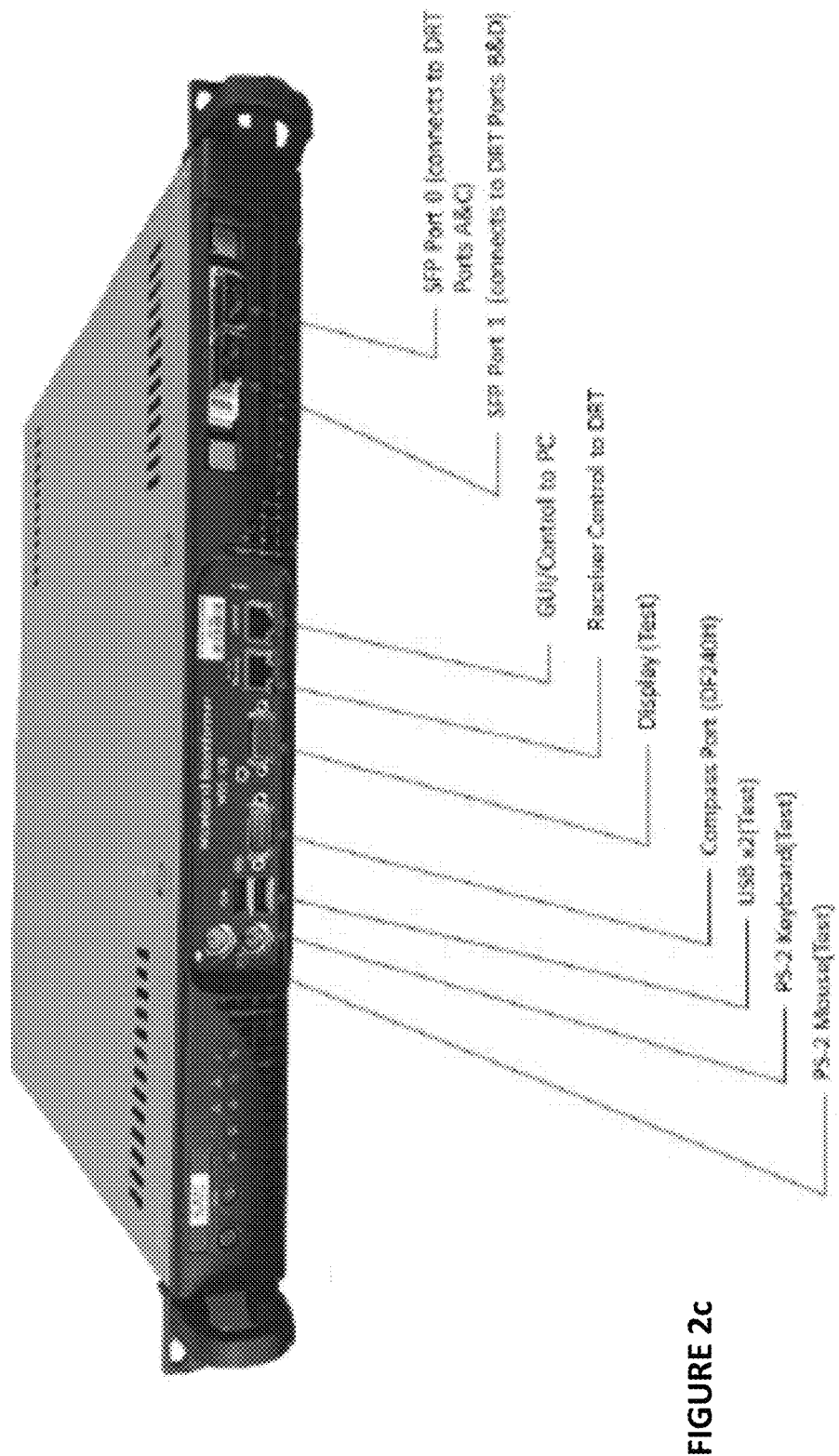

Referring to FIGS. 2a-2c, an exemplary WBS hardware implementation 200 is shown. The exemplary implementation includes an 8-channel coherent antenna 225 and a 1U commercial server with an FPGA card 230 (e.g., Xilinx Kintex7) programmed with the WBS processing functionality (hereafter the "WBS server"). Additional exemplary server details are shown in FIGS. 2b and 2c. In operation, the server 230 accepts 8 coherent digitized data streams from a digital tuner 227 (e.g., NDR308 from Cyber Radio) over 10 GigE interface formatted links, applies the beamformer solutions in real-time, and outputs the resultant wideband signals on 10 GigE outputs to the external receivers 280 (e.g., Digital Receiver Technology (DRT)). The 10 GigE data use VITA49 link layer formatting. The adaptive algorithms, burst demodulation and control functions are implemented in a single core embedded computer running Linux 240. System control is implemented through a JAVA GUI application which runs locally on the embedded computer or remotely across the network. The particular implementation shown in FIGS. 2a was designed to balance affordability with functionality at both fixed and mobile sites. One skilled in the art recognizes the numerous variations in hardware and software implementation and additions thereto to support data transmission and storage. The example provided herein is not intended to be limiting.

The WBS architecture provides for optimum hardware/software partitioning, wherein the FPGA implements the high-speed, real-time frequency domain beamformer(s) for each cell. This portion of the digital signal processing (DSP) is signal invariant, i.e., the same for all wireless signal formats. The WBS architecture is interoperable with existing site surveillance equipment. The WBS I/O is scalable to 16 wideband Rx and 4 wideband outputs; enabling independent multi-band coverage, or higher dimensional signal processing to support 2×2 and 4×4 MIMO surveillance. Alternatively, the current system can be sub-divided to support 2 independent, 4-antenna BFs for 80 MHz band coverage. Further, the WBS provides for additional integration with third party DSP and SDR architectures and supports mixed FPGA and embedded CPU processing.

One skilled in the art recognizes that the WBS functionality is not locked into FGPA hardware, and can support software only solutions providing the real-time throughput. For instance, Graphical Processing Units (GPUs) can implement much of the FPGA's core high speed streaming functions. Currently COTS GPUs are I/O bound and can support only a fraction of the I/O bandwidth of a single FPGA. Thus, at the present time, the FPGA-based solution is preferred to meet affordability and lowest SWAP.

The WBS has two primary modes of operation. In the Survey Mode, the WBS scans the cellular band and constructs a database of cell tower transmitters that can be successfully processed by the beamformer. Channel ID and measured beamforming output signal to noise ratios are sent to the GUI for operator review and selection. In the Beamforming Mode, the WBS applies the unique beamformer for each selected cell transmitter to the real-time data from the antenna array. The beamformer for each cell is then periodically recomputed to track changes in the RF and CCI environment.

Figure 3:
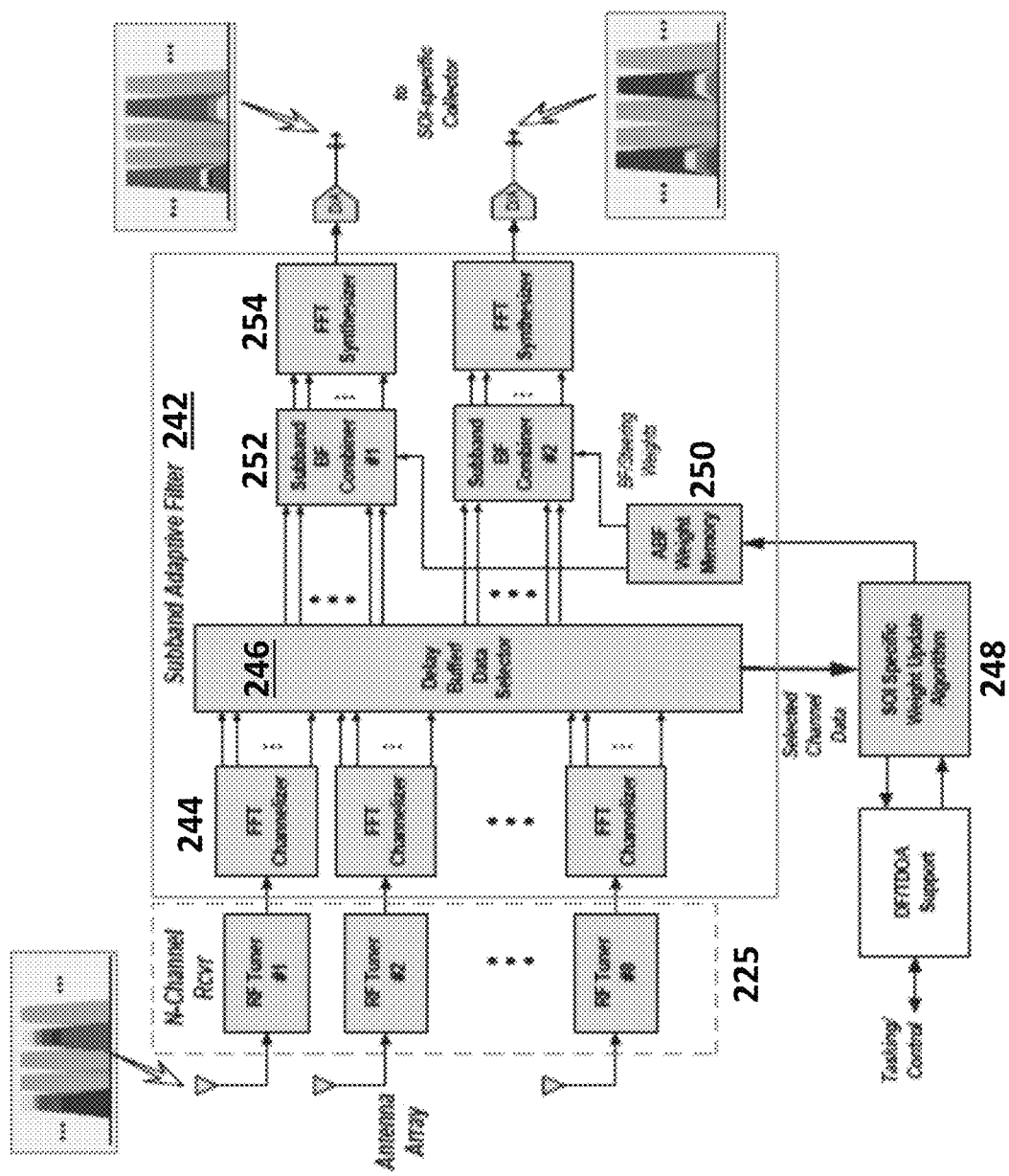
FIG. 3 is a schematic of an exemplary WBS implementation and process in accordance with one or more embodiments described herein.

A more detailed description of the WBS processing is described with reference to FIG. 3 which details the processing steps performed by the WBS processor/server (230, 240). As discussed with reference to FIG. 1, the antenna array receives multiple overlapping wideband signals, i.e., co-channel input spectrum, from one or more transmitters (cells/towers) located at various distances, elevations and angles from the antenna array. In FIG. 3, the antenna array 225 is an N-Channel receiver which outputs up to 8 RF tuned input signals (hereafter Input Signals) either directly (or indirectly) to a subband adaptive filtering (SAF) module 242. The Input Signals are converted to digital format prior to processing at the SAF module 242. At the SAF module 242, the Input Signals are subjected to polyphase FFT (Fast Fourier Transform) at channelizers 244 to decompose the Input Signals from N antennas into subbands, i.e., channels, and provided to a delay buffer/data selector 246. Selected channel data is provided from the delay buffer/data selector 246 to a weighting algorithm module 248. The weighting algorithm module 248 stores signal-of-interest (SOI) specific weight update (filter) algorithms which are selectively provided to/updated in an adaptive beamformer (ABF) weight (filter) module 250 responsive to the selected channel data. In selecting one or more weighting (or adaptive filtering) algorithms, the weight module 250 considers the details in the selected channel data including, but not limited to SOI features and direction of arrival; trade-off between good performance and computation requirements, need for interference and multipath mitigation.

Next, at 252 and 254, the SAF applies the weights (filters) supplied from the adaptive beamformer (ABF) weight (filter) module 250 to the channels, combines and re-synthesizes resulting scalar channels to reconstruct the co-channel mitigated passband and map different sets of emitters (transmitters/cells/towers) to different channels and wideband output streams. The SAF also includes the ability to translate signals around in passband prior to re-synthesizing and output different emitter signals on multiple passbands. The output signals (hereafter Output Signals) exit the SAF 242 to designated channels at pre-configured receivers.

Channelizers (synthesizer) 244 are designed as low pass filters with the following attributes: near perfect reconstruction pseudo-QMF designed using Iterative Constrained Least Squares; square of the response is Nth-band filter; cascade is all pass and >80 dB out-of-band rejection which minimizes channel artifacts belonging to adjacent signals. An exemplary channelizer (synthesizer) 244 specification includes: 256 channels over 51.2 MHz passband; 200 kHz channel spacing; 2048 tap FIR, Q25; Nominal 2× oversampled and Weighted Overlap Add. The channelizer 244 can be optimized for specific signal formats (e.g., OFDM).

Figure 4A:
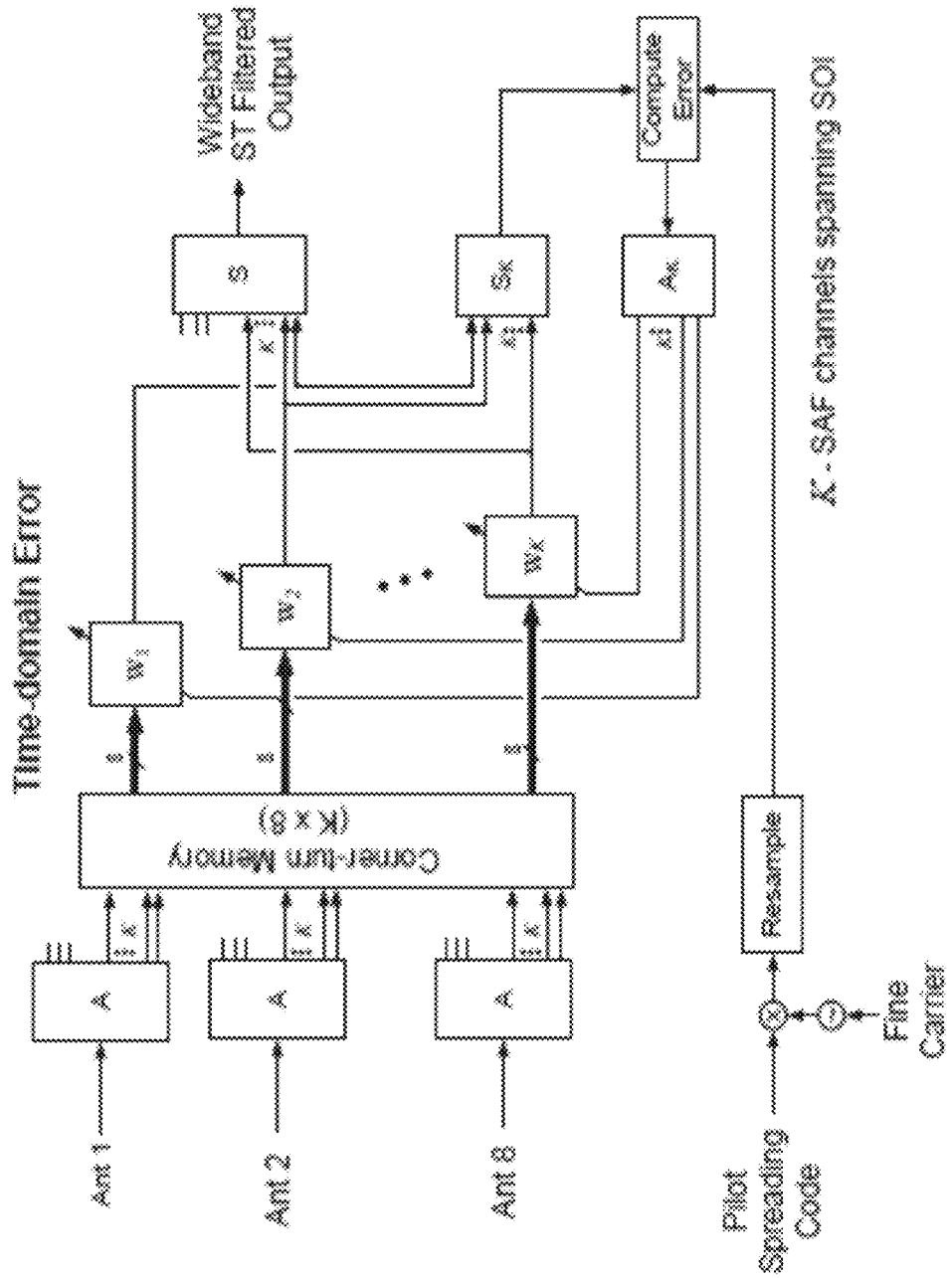
FIGS. 4a-4c are schematics of varying beamformer weighting implementations in accordance with signal type.
Figure 4B:
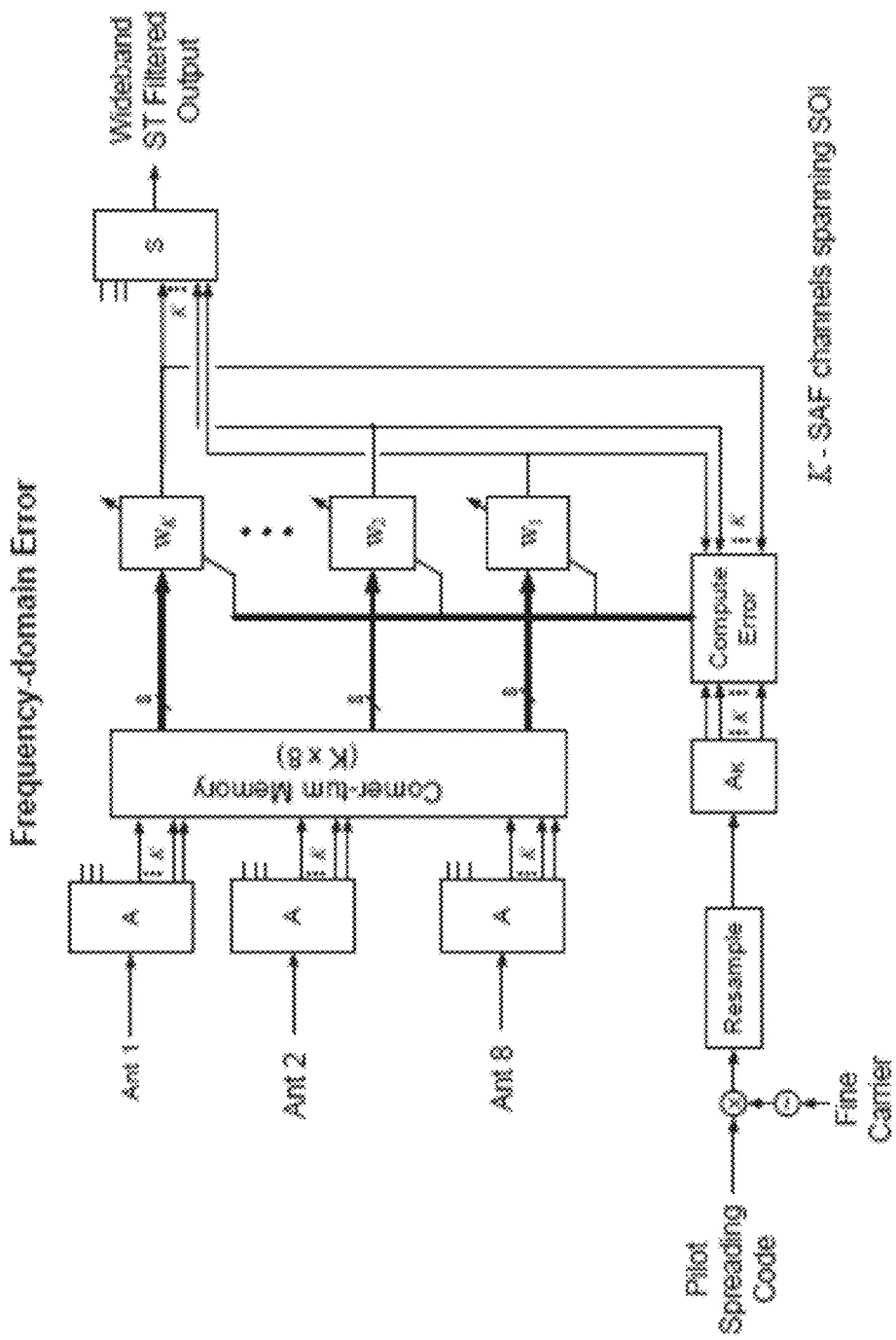
Figure 4C:
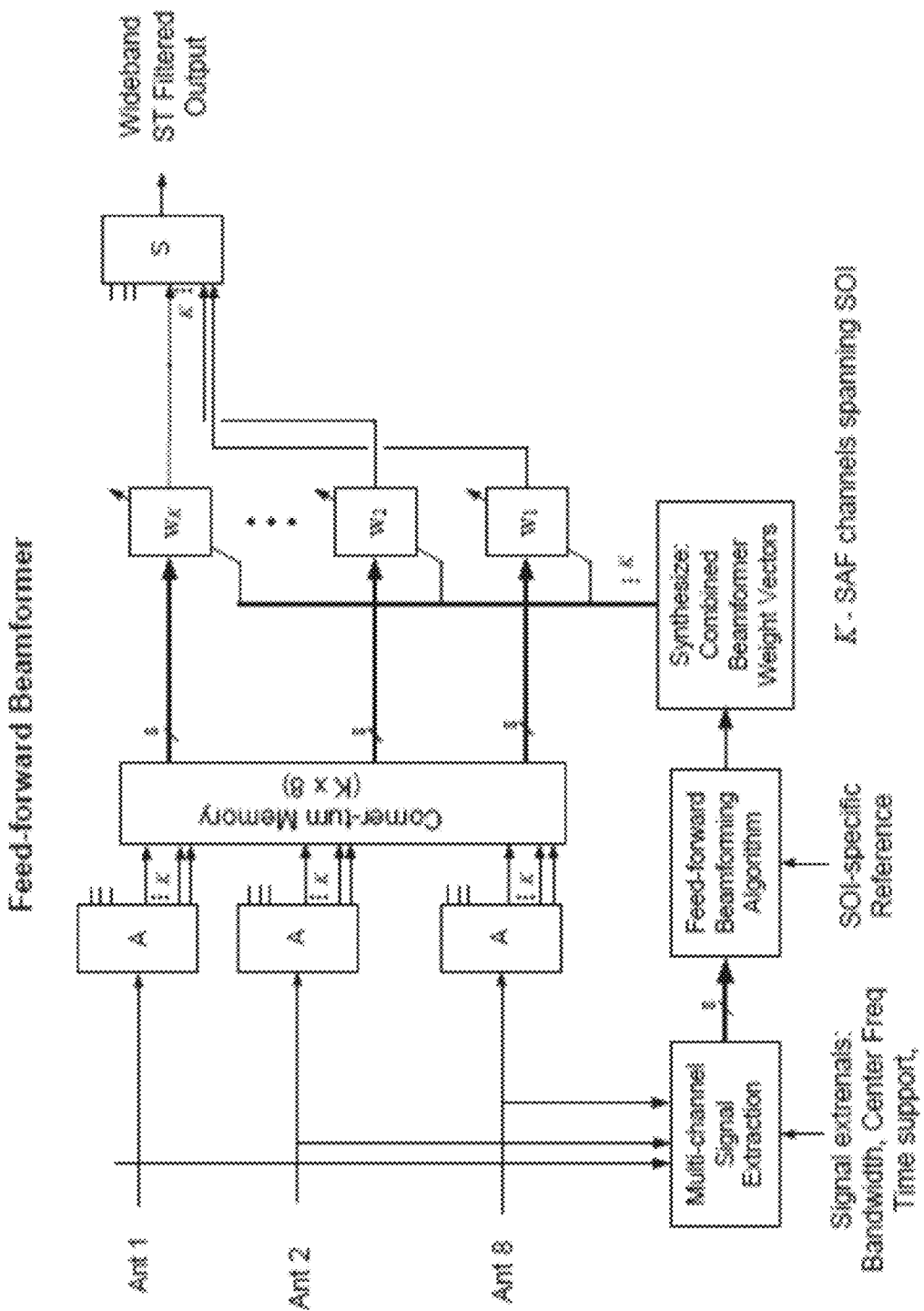

Referring to FIGS. 4a to 4c, the adaptive signal processing (ASP) architecture described herein is applicable to different signal types with minor variations that will be appreciated by those skilled in the art. FIG. 4a is exemplary of the ASP architecture adapted to time-domain error calculation for OFDM/OFDMA signal types, wherein the process re-synthesizes filtered (scalar) channels to reconstruct SOI and develops error signals and re-transform error signals through the corresponding channelizer to drive filter weight adaption. FIG. 4b is exemplary of the ASP architecture adapted to frequency-domain error calculation for GSM signal types, wherein the process transforms a reference signal with corresponding K-channel filter bank and computes error on a per channel basis and adapts filter weights. Finally, FIG. 4c is exemplary of the feed-forward beamformer (FFB) process that is described with reference to FIG. 5 and includes: extraction of each SOI via digital down-conversion and filtering; developing the S-T beamformer solution for each desired signal channel; stitching together (combining) the solutions from multiple channels to develop the equivalent wideband beamforming solution and uploading weight solutions to the applicable FPGA.

Figure 5:
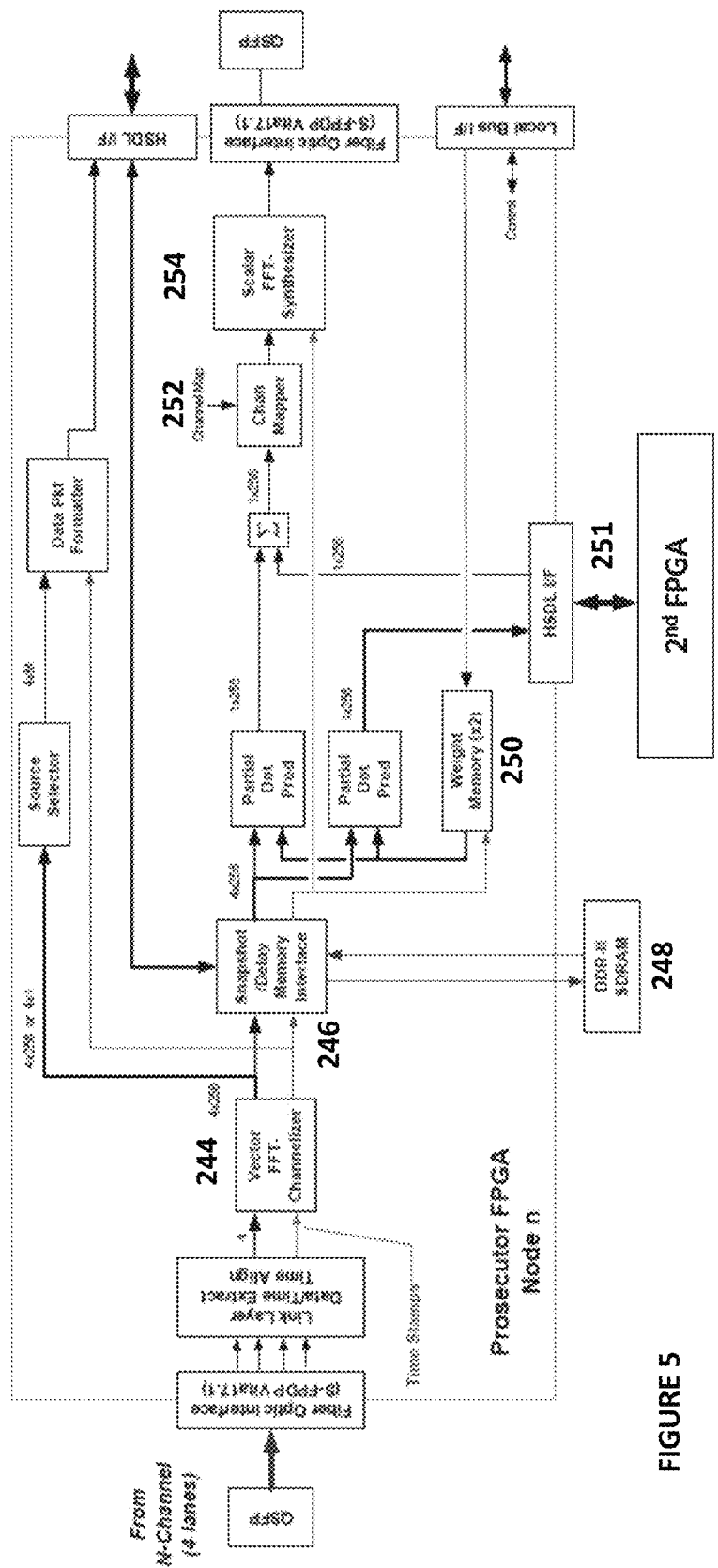
FIG. 5 is a schematic of dual FPGA beamforming processes of the a WBS in accordance with one or more embodiments described herein.

Referring to FIG. 5, an exemplary FPGA implementation flow for one of two duplicative FPGAs included in a WBS in accordance with and embodiment of the present invention is shown. Duplicative and independent FPGAs are used to process the 8 antenna lanes/streams (4 lanes/streams each FPGA). The FPGA coherently digitally down-converts, resamples and channelizes 8 antenna inputs, wherein sampling frequency (Fs)=96 MHz; resampling frequency (Fs')=51.2 MHz and the Input Signals are channelized by 256 point FFT with 200 kHz channel spacing. At 40 MHz passband, the channelizer 244 produces greater than 150 "subband" channels and optimally 200 "subband" channels. Sub-band channels are oversampled based on the amount of input overlap used in the channelizer. Input overlap will always be approximately 50%.

The delay buffer/memory 246 corner-turns the channel data through the DDRII (or other suitable) memory 248 which involves transposing the 3-D matrix from 200×4×M to 4×200×M in each FPGA; wherein M is page/block size determined by timing and throughput.

Next, inner product multiplication (dot product) of each subband channel stream by a unique 8×1 weight vector is applied. The weights are computed by an embedded (or otherwise accessible) processor and downloaded to dual-port weight memories 250 and may be updated without halting or disrupting the streaming process. Since there are two independent FPGAs, partial products are computed on the separate FPGAs and passed across a high speed data link (HSDL) interface (I/F) to form the full dot product. Two dot products implies two separate and independent beamformers. Accordingly, the process produces 1×200×M matrix on each FPGA.

Next, the channels are mapped and de-channelized, resampled and digitally up-converted. The de-channelizer 254 uses 256 point FFT with the same overlap, resampling frequency (Fs')=51.2 MHz.

In an exemplary use scenario, the primary functions and operations of the WBS are configurable by a user through a Java-based user interface (UI). The WBS UI facilitates configuration and control of Mission Configuration, Survey Mode and Beamforming Mode. A related step in the process is Receiver Configuration, which facilitates configuration of downstream equipment to receive beamformed signals generated during the Beamforming Mode.

Figure 6:
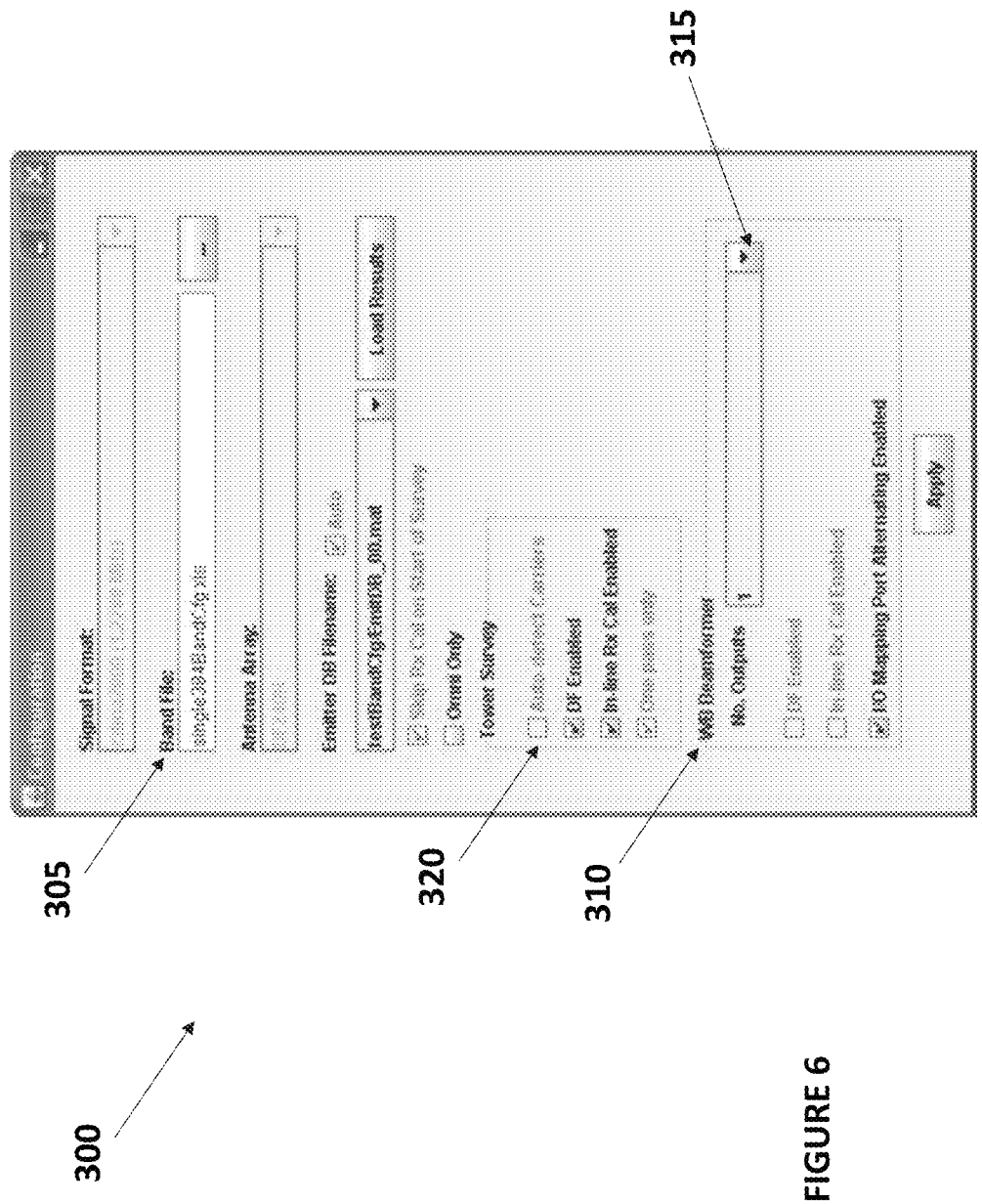
FIG. 6 is an exemplary dialog box for configuring mission parameters for WBS processing in accordance with one or more embodiments described herein.

The Mission Configuration process prompts identification of the parameters and values that are required to survey an area for signal cells. A configuration file (band file), e.g., Excel spreadsheet, may be used to list all of the WBS parameter and value requirements including: specifications such as the center of band frequency, the number of channels to scan, a list of channels to scan, the frequencies the channel numbers, etc. An exemplary dialog box 300 for prompting entrance of required parameters and values is shown in FIG. 6. The Band File browse button 305 may be used to select from several preconfigured or customizable configuration files for different bands, e.g., CDMA2000, 1.2288 MHz. Upon selection of the preconfigured file, default values will be populated and may be accepted or customized. In the WB Beamformer section 310, a drop down menu 315 accepts user selection of the number of active RF output ports for the mission. The number of ports depends on the number of downstream receiver inputs (1 or 2). Additional features, such as the Auto-detect Carriers setting 320 under the Tower Survey box provides the ability to configure the mission to scan the band and identify all CDMA carriers, independent of the band configuration file that is being used.

Using Survey Mode, a user is able to identify all of the towers and sectors in the radio field of view. The scope of discovery is determined by the aperture and elevation of the antenna, and by tower density in an area. WBS can detect towers up to 26 kilometers, depending on the number of towers in the area. WBS can estimate tower range for CDMA signal types, and can provide precise GPS time stamps for external TDOA-based geolocation. FIGS. 7a to 7d illustrate a dialog box snap shot 400 and portions thereof of Survey Mode results in accordance with a Mission Configuration. Each scanned channel goes through a 2-pass sequence in WBS. WBS cycles through the progress stages twice (Capture/Mem Tx/Detect) for each channel number: the first time for the omnidirectional antenna to find the towers, and a second time for the 8 element antenna to do detection beamforming. Capture is the process of recording a snapshot file of the RF environment, Mem Tx is recording a snapshot file for processing and Detect is processing of the snapshot files to look for signals.

Figure 7A:
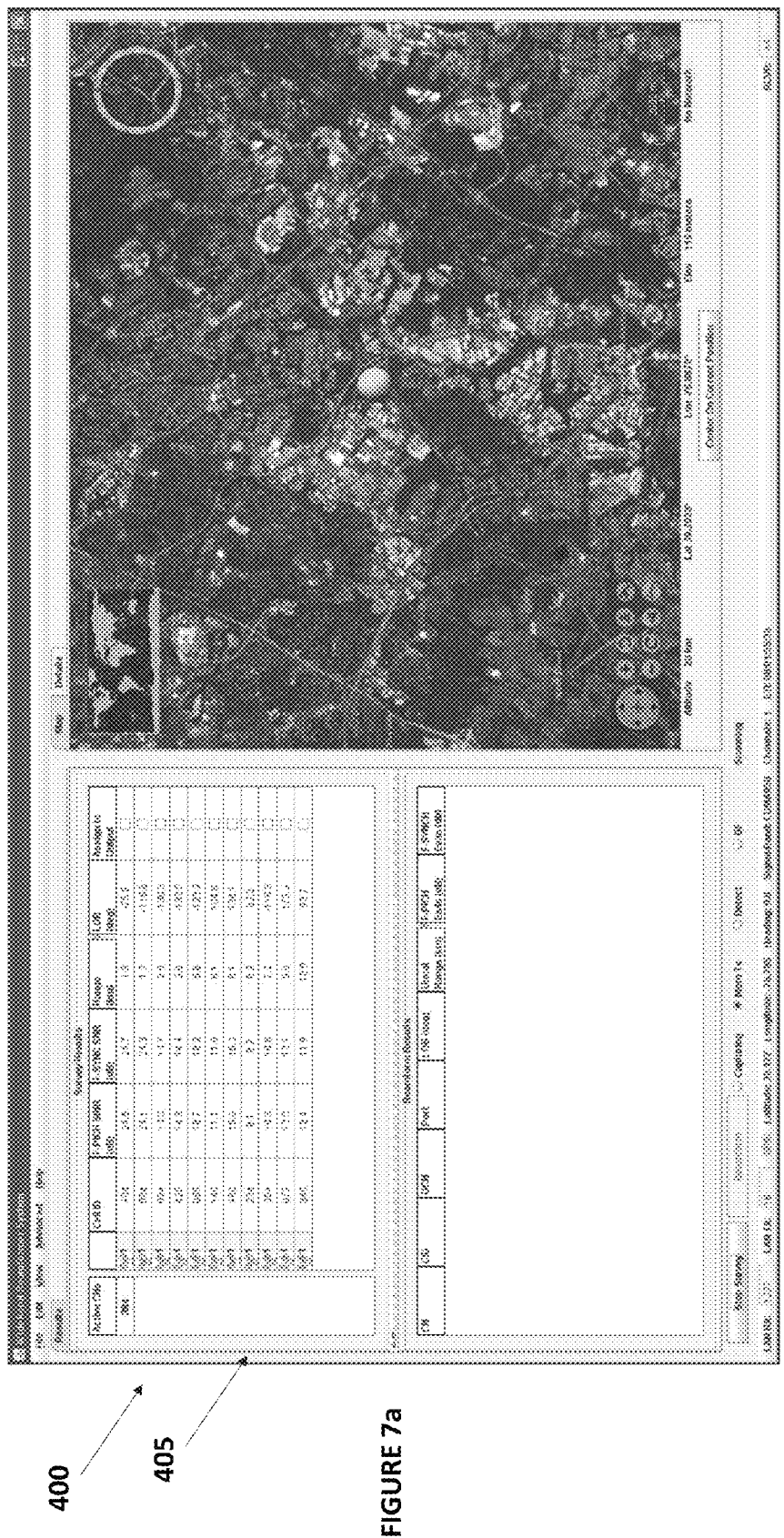

The dialog box in FIG. 7a includes additional pertinent information for user review and consideration including: LAN RX which indicates the number of messages received by WBS; LAN TX which indicates the number of messages sent by WBS during the scan; GPS which may be color coded to indicate status as valid and locked to GPS time, lost signal (e.g., due to environmental interferences) and bypass mode; Latitude/Longitude which is location of the antenna; Heading which is direction antenna is pointing; Signal/Band which is type of signal detected (such as CDMA850) and confirmation that the band of interest has been detected; Channels which indicates number of channels scanned; ETI which is elapsed time indicator since the UI was turned on (this could include multiple missions/scans/beamforms) and refreshes periodically; and RCVR which indicates temperature of the antenna in degrees centigrade and may turns red or emit sound or other signal as a warning when temperature is above/below ideal, e.g., at 50 degrees centigrade.

The portion 405 of the dialog box 400 shown in FIG. 7b provides information under the Survey Results tab 410 and includes identification of the Cell IDs, signal strengths, and geographic locations of the scanned towers. More particularly, the Survey Results include: Active CNs which are channel numbers of the active channels that were scanned (the Active CN of the channel that is currently being scanned turns a color, e.g., blue, as Survey Mode progresses); Tower icon+ Channels which is how many channels are broadcasting on a tower; CID which is cell ID number of a tower; F-PICH SINR (dB) which is Signal to Total Interference Plus Noise Ratio for the pilot channel; F-SYNCH SINR (dB) which is Signal to Total Interference Plus Noise Ratio for the sync channel; Range (km) which is uncalibrated range to a tower; LOB (deg) which is line of bearing to a tower from the scan location and Assign to Output which is used to isolate a tower of interest for beamforming.

Figure 7C:
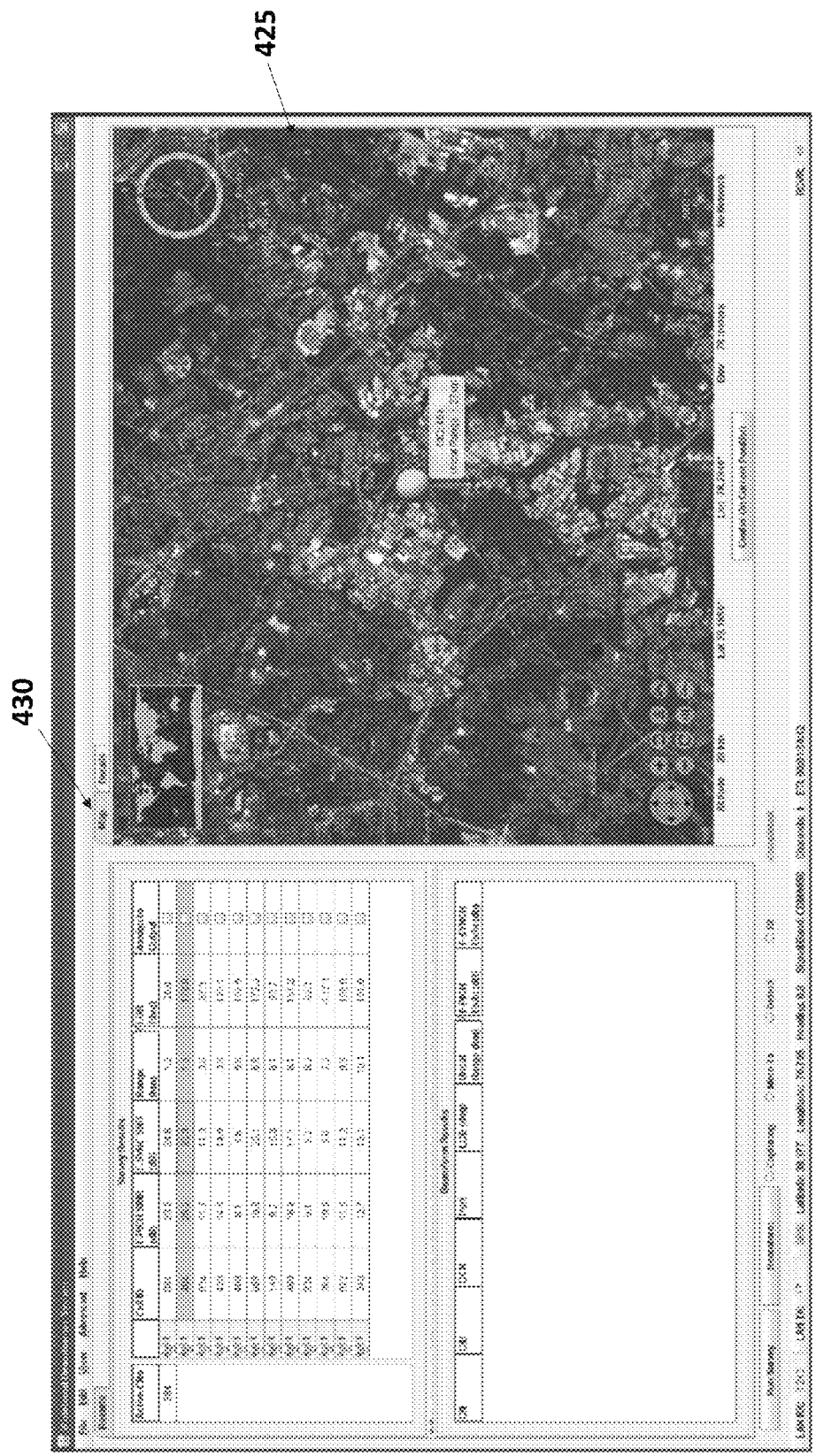

The map portion 425 of the dialog box shown in FIG. 7c provides for individual tower position information overlaid on the map. This view is selected using the Map tab 430 and individual towers are user selected from the Survey Results tab 410 by highlighting a tower in the listing.

Figure 7D:
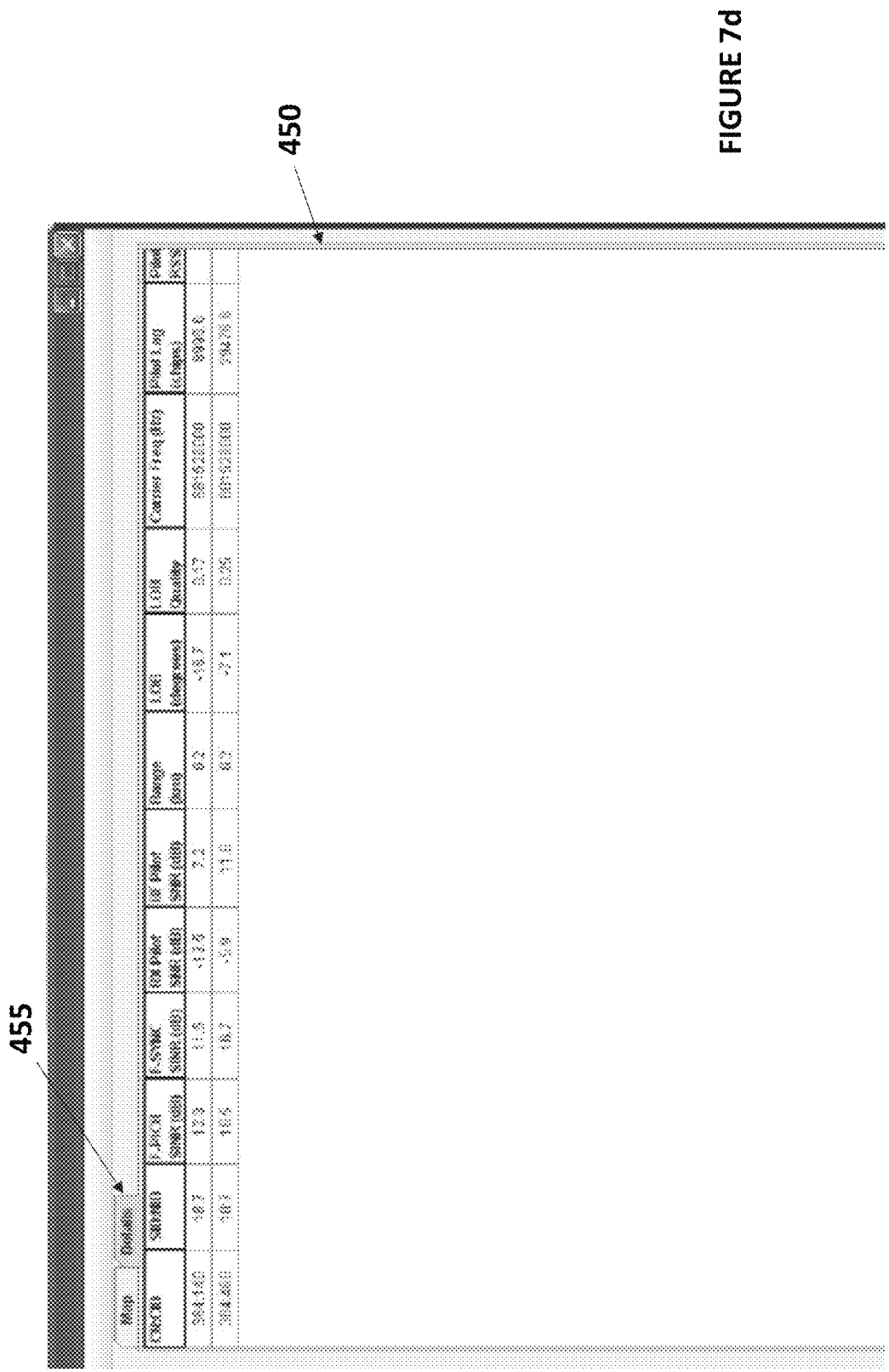

Further, the details portion 450 of the dialog box shown in FIG. 7d provides for a visual representation of relative signal strength and frequencies from each tower for all detected towers. The number of detected and plotted towers under the Details tab 455 may be greater than the number of cells (towers) listed under the Survey Results tab 410. This is because Survey Results tab 410 only lists results for towers scoring a pilot or sync subchannel SINR greater than a configurable F-SYNC threshold, e.g., 3. The Details results include: CN.CID which is the channel number of the active channel that was beamformed and the Cell ID number of its tower; SID:NID which is the system ID and network ID of the cell ID; F-PICH SINR (dB) which is Signal to Total Interference Plus Noise Ratio for the pilot channel; F-SYNCH SINR (dB) which is Signal to Total Interference Plus Noise Ratio for the sync channel; RX Pilot SINR (dB) which is Signal to Total Interference Plus Noise Ratio for the receive pilot channel; BF Pilot SINR (dB) which is Signal to Total Interference Plus Noise Ratio for the calculated beamformed pilot channel; Range (km) which is uncalibrated range to a tower; LOB (deg) which is line of bearing to a tower from the scan location; LOB Quality which is estimated quality of the LOB calculation (a value close to 1 indicates a high quality LOB calculation); Carrier Freq (Hz) which is receive carrier frequency of the examined channel; Pilot Lag (chips) which is measurement of the signal time offset relative to PN_OFFSET=0 and Pilot RSS (dBm) which is pilot receive signal strength.

Figure 8A:
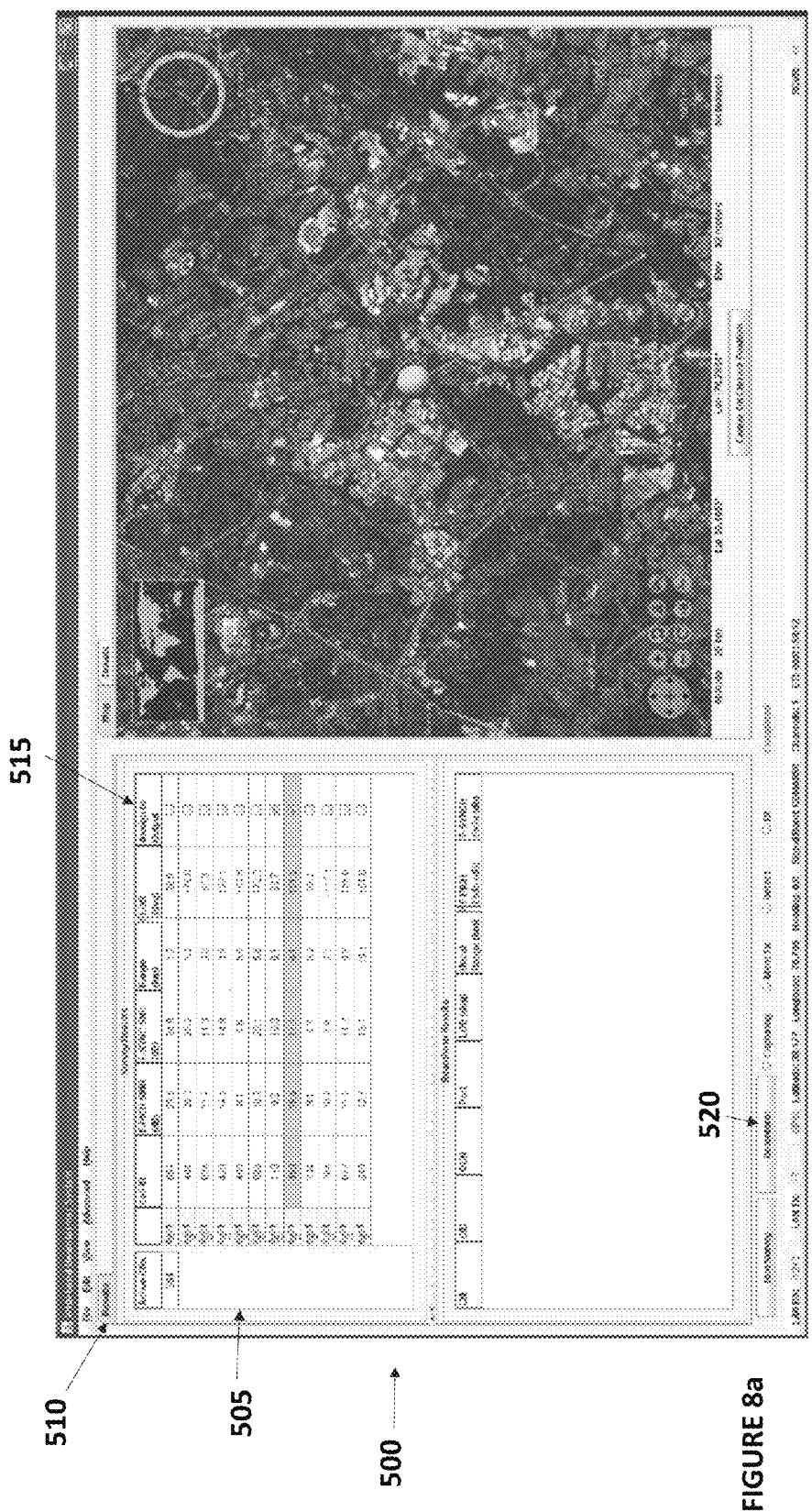
FIGS. 8a-8b are exemplary dialog boxes for illustrating the beamforming process inputs and outputs from the WBS processing in accordance with one or more embodiments described herein.
Figure 8B:
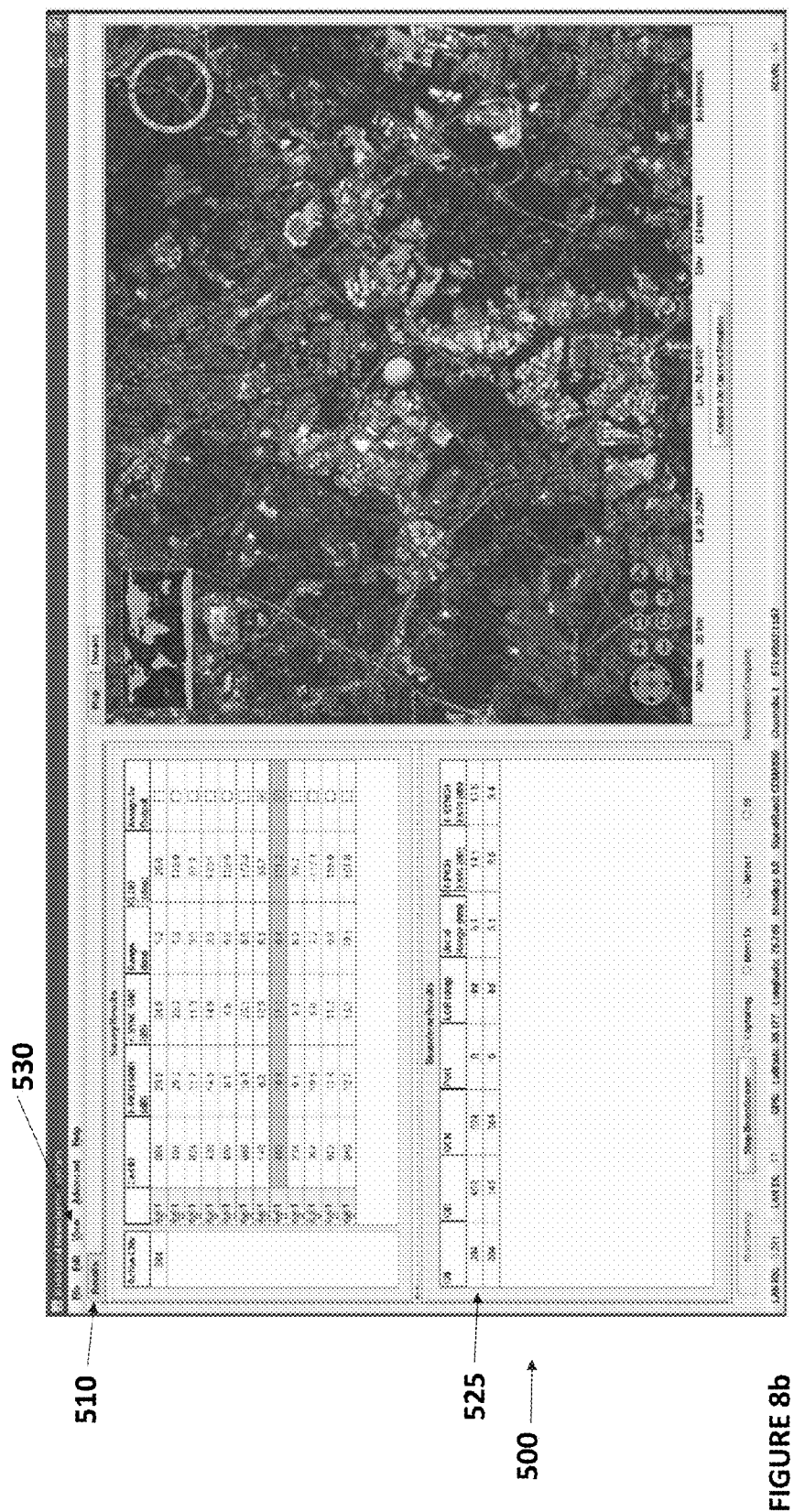

In the Beamforming Mode, a user can select one or multiple towers of interest for beamforming. The WBS adaptively beamforms each selected transmitter from the Survey Mode, mapping the signals across multiple 40 MHz outputs. Each signal is output at the original RF and translated to unused portions of the output spectrum for direct input to receivers. FIGS. 8a and 8b illustrate a dialog box snap shot 500 and portions thereof of Beamforming Mode results in accordance with a Mission Configuration and selected towers from the Survey Mode results described above.

Referring to FIG. 8a, the portion 505 of the dialog box 500 shows selection of multiple individual towers under the survey results listed under Results tab 510 by selecting the associated boxes in the Assign to Output column 515. In order to initiate the beamforming process, the user clicks on the Beamform button 520. Once initiated, the beamforming process weights the input from the antennas to null out the most powerful signals and to isolate the weaker towers. The dialog box 500 continues to provide: LAN RX which indicates the number of messages received by WBS; LAN TX which indicates the number of messages sent by WBS during the scan; GPS which may be color coded to indicate status as valid and locked to GPS time, lost signal (e.g., due to environmental interferences) and bypass mode; Latitude/Longitude which is location of the antenna; Heading which is direction antenna is pointing; Signal/Band which is type of signal detected (such as CDMA850) and confirmation that the band of interest has been detected; Channels which indicates number of channels scanned; ETI which is elapsed time indicator since the UI was turned on (this could include multiple missions/scans/beamforms) and refreshes periodically; and RCVR which indicates temperature of the antenna in degrees centigrade and may turns red or emit sound or other signal as a warning when temperature is above/below ideal, e.g., at 50 degrees centigrade identification of the Cell IDs, signal strengths, and geographic locations of the scanned towers.

The portion 525 of the dialog box 500 shown in FIG. 8b provides beamform results information under the Results tab 510 and includes: CN which are channel numbers of the active channels that was beamformed; CID which is cell ID number of a tower; OCN which is output channel number; Port which is identifies which RF beamformer output the signal is active on (the port number will be either 0 or 1. If only 1 output was previously selected, the Port number will always be 0. If 2 output ports were configured, the Port identifies the output port that is being used); LOB (deg) which is line of bearing to a tower from the scan location; Uncalibrated Range (km) which is the uncalibrated range from the antenna to a tower; F-PICH Es/Io(dB) which is Signal to Total Interference Plus Noise Ratio for the pilot channel and F-SYNCH Es/Io (dB) which is Signal to Total Interference Plus Noise Ratio for the sync channel. The beamform results are constantly updated as the Beamforming Mode is a continual process. WBS refines the beam weights and adjusts for environmental conditions to maintain the weighted channels and to keep strengthening the tower of interest (for example, if the antenna moves slightly in the wind).

Figure 9:
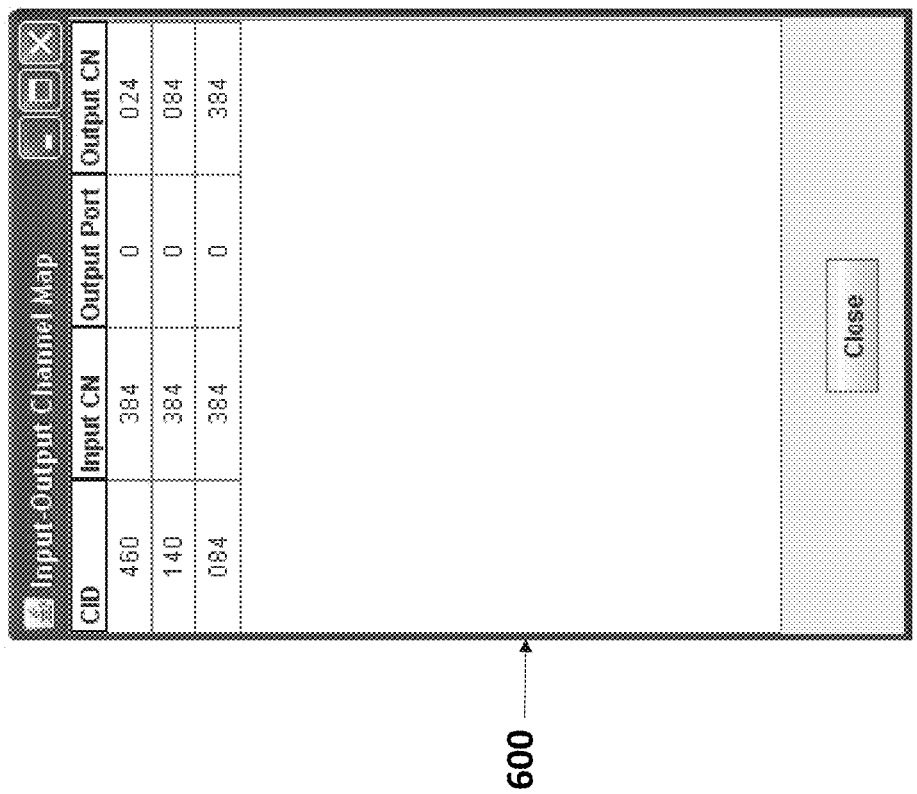
FIG. 9 is an exemplary dialog box for illustrating an input-output channel map from the WBS processing in accordance with one or more embodiments described herein.

Finally, a user's downstream receivers may be configured to receive the beamform signals by selecting the View tab (530) on the dialog box 500 toolbar as shown in FIGS. 8a and 8b. Under the View tab 530 will be an Output Map option (not shown) providing access to the Input-Output Channel Map specifications shown in dialog box 600 of FIG. 9. The dialog box 600 includes: CID which is cell ID number of a tower; Input CN which are channel numbers of the active channel that was beamformed; Output Port which is the output port number identifying the RF beamformer output the signal is active on, either 0 or 1; and Output CN which is output channel that the signal was remapped to during beamforming. The user uses the specifications in 600 to assign output channel numbers (Output CN) to their downstream receivers. WBS stacks the outputs from the survey results. As each selected tower is beamformed, WBS translates the signals to unused portions of the output spectrum, mapping the signals to new output channels at the original RF.

Figure 10A:
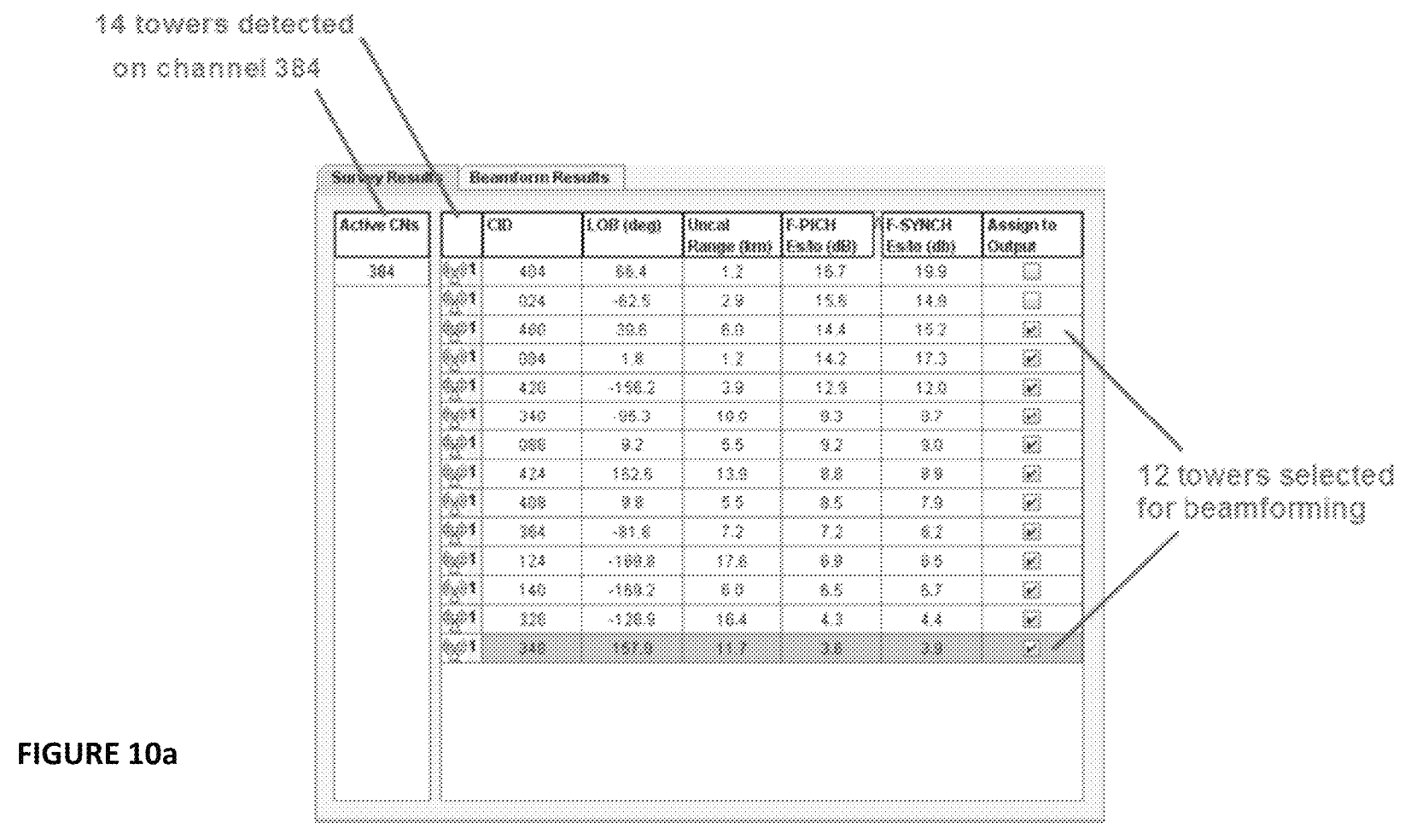

FIGS. 10a-10d illustrate a first channel mapping and assignment scenario wherein the Mission Configuration included a single channel, with multiple towers detected. As shown in FIG. 10a, on channel 384, there were 14 towers detected. Of these 14 towers, 12 were selected for beamforming. Referring to FIGS. 10b-10d, WBS maps input channel (Input CN) 384 (FIG. 10c) to 12 new output channels (Output CN) (FIG. 10d). In accordance with the Input-Output Channel Map of FIG. 10b, to receive the beamformed signals from channel 384, the user would assign output channels 024, 084, 144, 204, 264, 324, 384, 444, 504, 564, 624, and 684 to their downstream receiver.

Figure 11A:
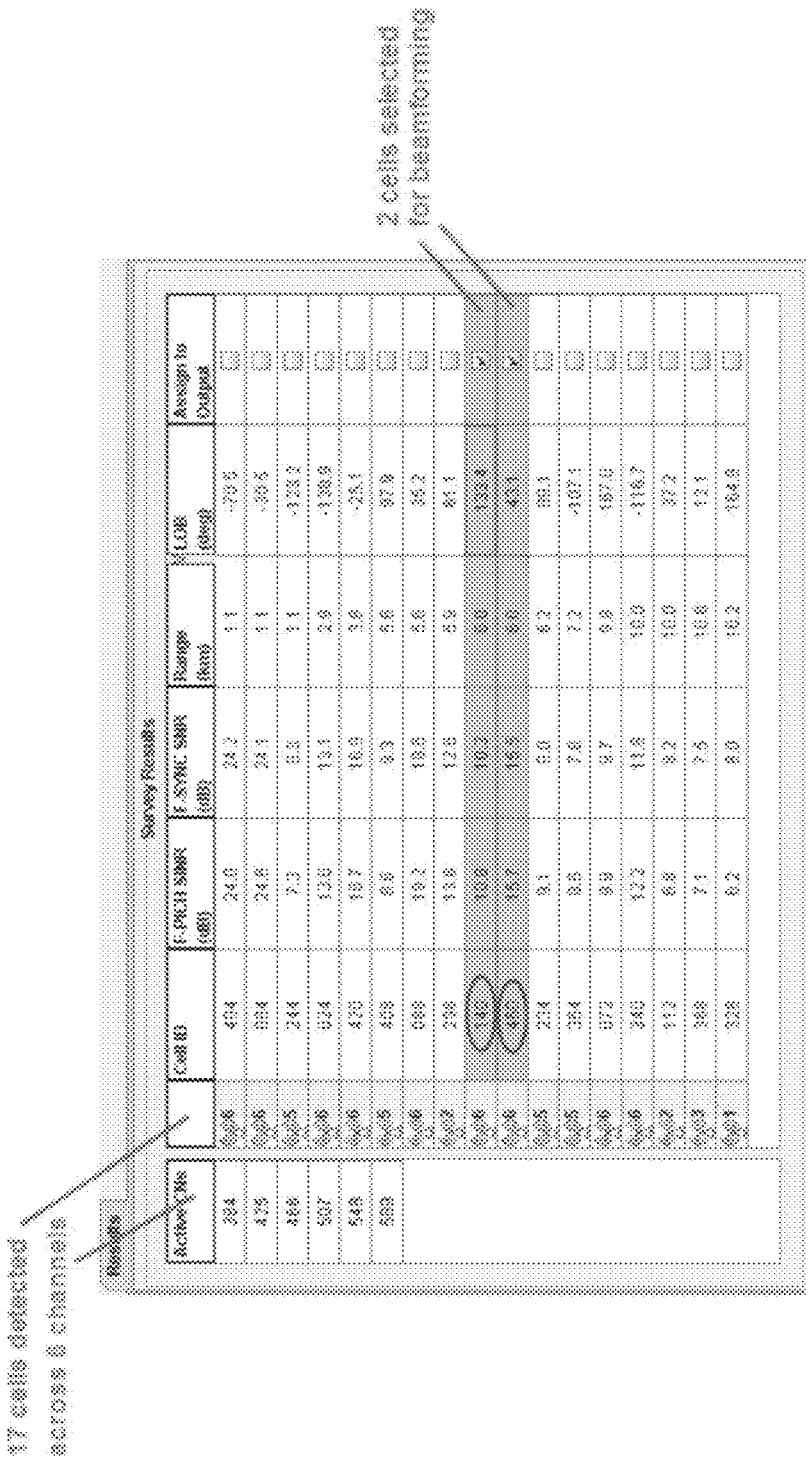

FIGS. 11a-11d illustrate a second channel mapping and assignment scenario wherein the Mission Configuration included multiple channels, with multiple towers detected. As shown in FIG. 11a, 17 towers (cells) were detected across 6 channels. Of these 17 towers, 2 (140, 460) were selected for beamforming, each with 6 channels. Referring to FIGS. 11b-11d, WBS maps the 12 input channels (Input CN) (FIGS. 11c) to 12 new output channels (Output CN) (FIG. 11d). In accordance with the Input-Output Channel Map of FIG. 11b, to receive the beamformed signals from tower (cell) 460 stacked in the 384-589 range, the user would assign output channels 024, 065, 106, 147, 188, and 229 to their downstream receiver. Similarly, the user would assign output channels 384, 425, 466, 507, 548, and 589 to the receiver to capture the data from tower 140.

The data volumes produced by the WBS-fed surveillance receivers depend on the density of cell sites, number of sites/channels targeted, cell signal format and specific parameters of the electronic surveillance activity.

Figure 12:
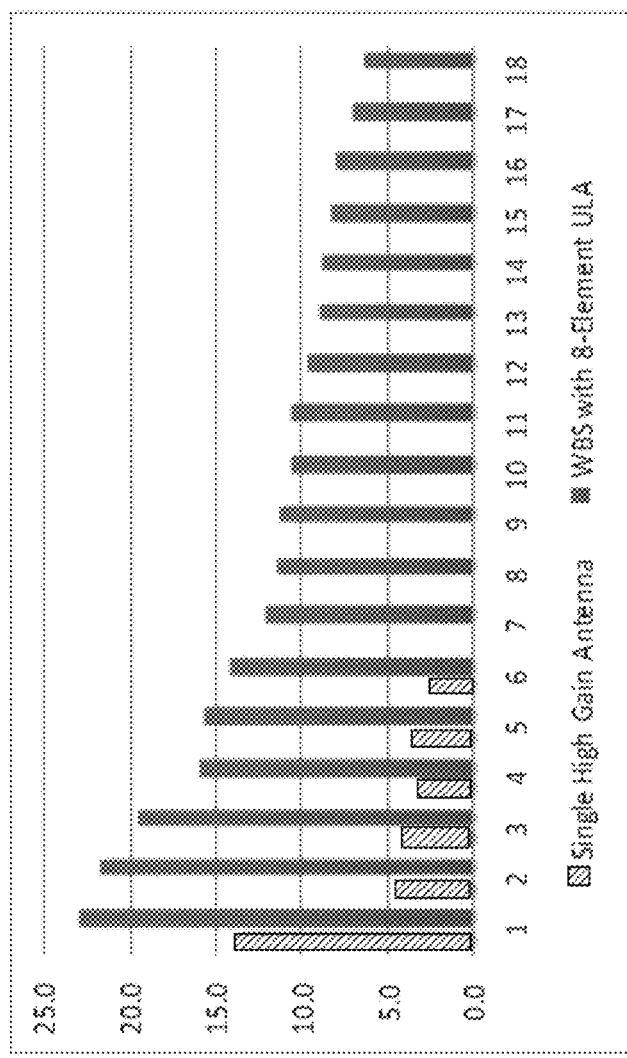
FIG. 12 illustrates exemplary WBS processing and scanning results from an exemplary test scenario.

A WBS in accordance with the embodiments described herein has been performance tested in multiple field trials comprising a wide variety of locations, terrains, and antenna configurations. In all cases, the WBS provides for a 10:1 improvement in surveillance range (typically beyond 10 km). Referring to FIG. 12, the results from tests comparing the simultaneous (side-by-side) operation of WBS performance with a high gain directional single LP antenna installation approach are shown. The single high gain antenna recovered only one cell site with signal-to-noise-ratio (vertical axis in FIG. 12) sufficient for reliable reception. This cell site was measured at 0.9 km distance. Five additional cell sites (#2 through #6) were detected but the received cell site signal was below the reception threshold required for reliable reception (approximately 7.0 dB). Using the WBS in line with the surveillance receiver, the number of recoverable cell sites jumped from 1 to 18 as shown in FIG. 12. With the inline WBS, the same 6 cells (#1 through #6) had received SNR equal to or greater compared to 1 cell in original configuration. An additional 12 cells. And there was a 10 fold increase in nominal surveillance range: from 900 meters to 9.9 km.

A modified WBS may also be used to combat CCI and low signal power for signals transmitted in GSM (and other cellular packet formats, e.g., GPRS and EDGE). More particularly, a key feature of the WBS architecture and process is that it computes a wideband beamformer solution enabling simultaneous co-channel interference mitigation of all signals transmitted by the cell base station transmitters. The beamformer works correctly over the entire operating frequency range of the cell network. This is particularly important for GSM surveillance because its uses frequency hop spread spectrum (FHSS) to mitigate fading and inter-cell interference. As the name implies, FHSS hops the carrier frequency of each signal through a set of pseudo-randomly selected channels which are distributed across all or part of the GSM operating band. All user traffic channels and most control channels (e.g., the TCH and SDCCH, respectively) in the GSM network operate in this way.

The only fixed frequency channel in the GSM network is the "beacon" channel which broadcasts synchronization and public network information, and is used by mobiles to sync to and enter the GSM network. The beacon channel can be used by the modified WBS to handle GSM via a two-step algorithm.

First the modified WBS scans for the GSM beacon channel transmitted by each cell/tower in the radio field of view. The modified WBS then utilizes the cell beacons to develop a "prototype" antenna pattern for each detected cell (including co-channel cells). Second, the WBS uses the prototype pattern to synthesize the equivalent wideband solution. The result is an antenna pattern, unique to each cell transmitter, which maintains its performance across the entire GSM operating frequency band; i.e., the main beam and the antenna nulls continue to be steered in the correct directions.

In a test of the modified WBS, the modified WBS process 8-antenna array snapshots of the GSM Beacons transmitted on 5 different ARFCNs shown in Table 1. No special antenna alignment or array calibration was used or required.

TABLE 1

| Beacon Channel ARFCN | SNR @ Strongest Input Antenna (dB) | SNR @ Beamformer Output (dB) | SNR Improvement (dB) |
| --- | --- | --- | --- |
| 128(A) | −2.0 | 10.0 | 12.0 |
| 128(B) | <0 | 8.1 | 8.1 |
| 179 | 5.6 | 11.5 | 5.9 |
| 181(A) | 6.1 | 7.9 | 1.8 |
| 181(B) | −1.9 | 7.5 | 9.4 |

TABLE 1-continued

| Beacon Channel ARFCN | SNR @ Strongest Input Antenna (dB) | SNR @ Beamformer Output (dB) | SNR Improvement (dB) |
| --- | --- | --- | --- |
| 237 | 7.4 | 15.9 | 8.5 |
| 239(A) | 22.0 | 20.7 | −1.3 |
| 239(B) | 16.1 | 22.0 | 5.9 |

As illustrated, five (5) separate beacon channels (128, 179, 181, 237 and 239) were recorded and processed through the modified WBS. The specific GSM network installation used for the test also implemented a beaconing scheme in which two co-channel cells from different cell clusters transmit on the same beacon channel, but the beacon signals are time-division multiplexed so that only one beacon is active at a time. This was implemented on 3 of the 5 beacon channels (channels 128, 181, 239). To distinguish these signals in testing, the beacon signals were arbitrarily assigned to one of two cell clusters, arbitrarily labeled "A" and "B". As a result there were a total of eight beacon processed on 5 RF channels.

Each beam formed beacon was then partially demodulated sufficient to measure its "raw" symbol SNR. The same beacon channels received from a single antenna were demodulated and their SNRs measured for comparison with the beamformer results. The demodulator only recovered the "raw" GSM symbols, no channel equalization or subsequent bit level processing was applied.

Using a single antenna, 3 of the beacon signals on 128A, 128B and 181B were unrecoverable, while the beacon SNRs for channels 179 and 181A were at the GSM receiver threshold (~6 dB). Using the modified WBS, all eight signals were recoverable with SNRs well above threshold.

The performance results are listed in Table 1: column 1 is the channel frequency index (i.e., ARFCN) from the GSM800 band plan and the A/B is used to indicate the cluster; column 2 is the SNR of the demodulated beacon signals for the 1 antenna case; column 3 is the SNR of the same beacon signal after beamforming by the WBS algorithm; and column 4 is the SNR improvement.

Figures 13A, 13B:
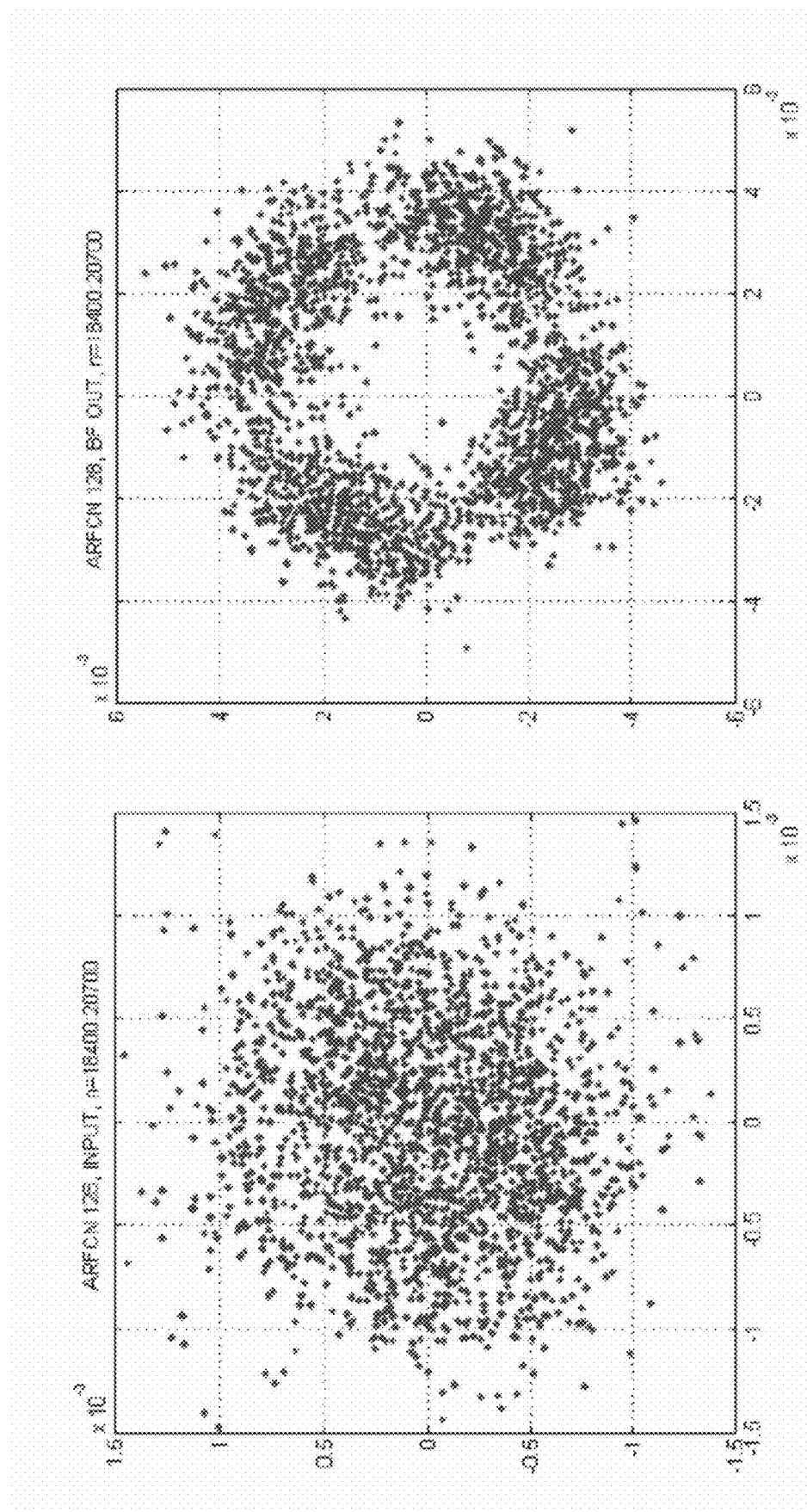
FIGS. 13a-13b illustrate exemplary before WBS processing and after WBS processing scanning results from an exemplary GSM signal test scenario.

An example of the performance achieved is illustrated in FIGS. 13a and 13b. The figure plots the demodulated GSM symbol constellation for the beacon identified on ARFCN 128, with (FIG. 13b) and without (FIG. 13a) beamforming. Without the modified WBS, the received signal was unrecoverable and the synchronization channels were barely detectable. With beamforming the demodulated symbol constellation shows the pre-equalized GSM/GMSK signal structure, and a measured symbol energy-to-noise ratio above 9 dB.

Figures 14A, 14B:
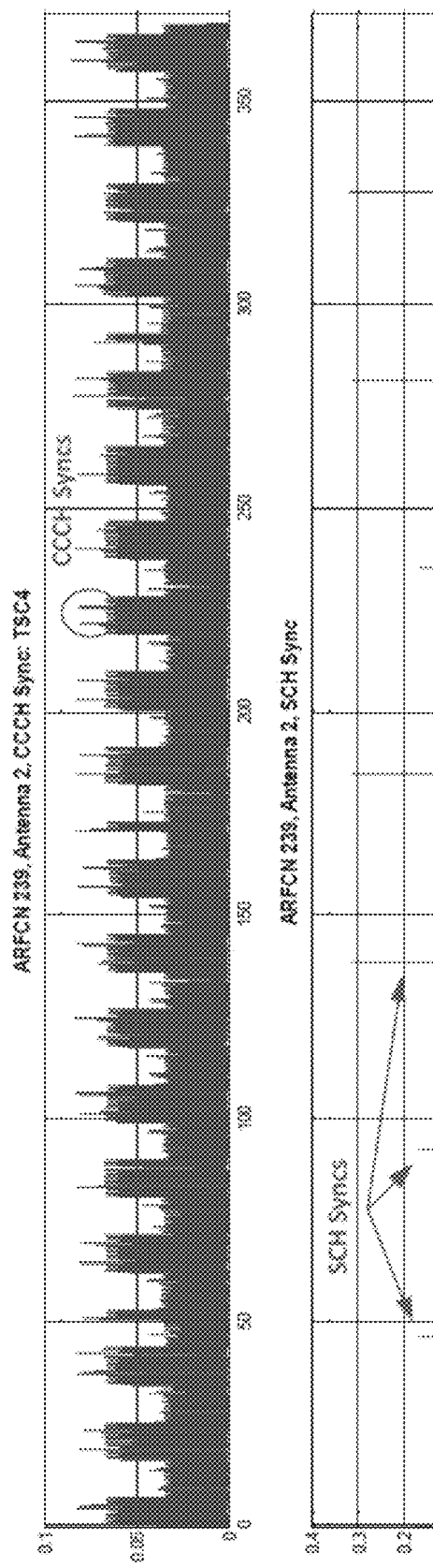
FIGS. 14a-14b illustrate a first channel synchronization output from a single antenna without WBS beamforming in according with an exemplary GSM signal test scenario.
Figure 15A:
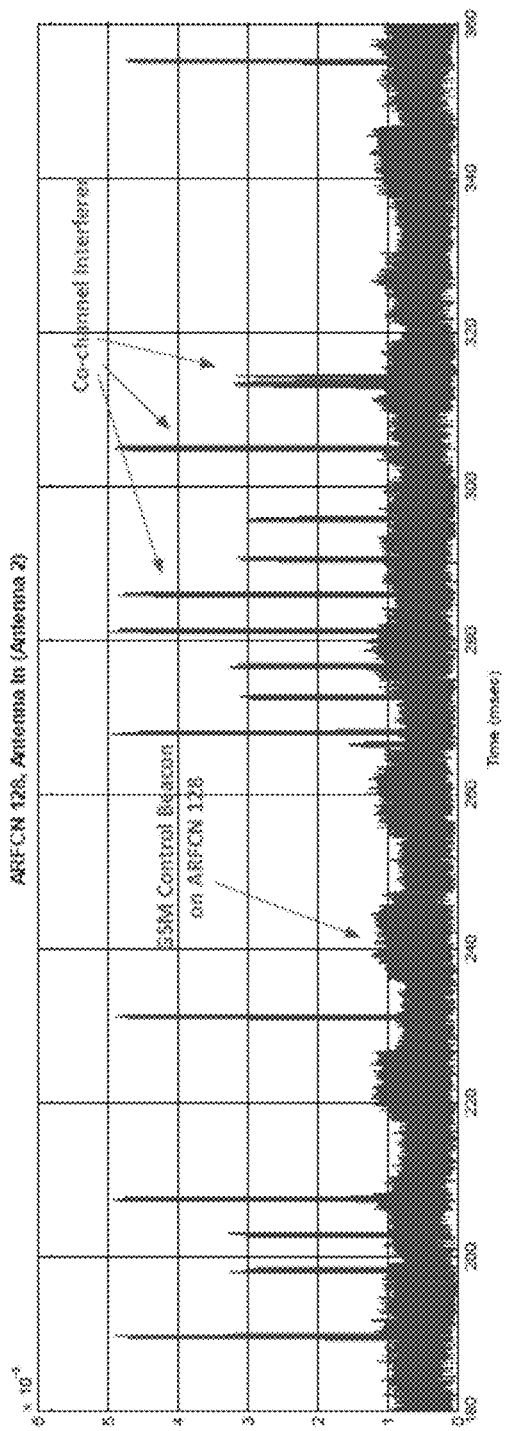
FIGS. 15a-15c illustrate a second channel synchronization output from a single antenna without WBS beamforming in according with an exemplary GSM signal test scenario.
Figure 15B:
Figure 15C:
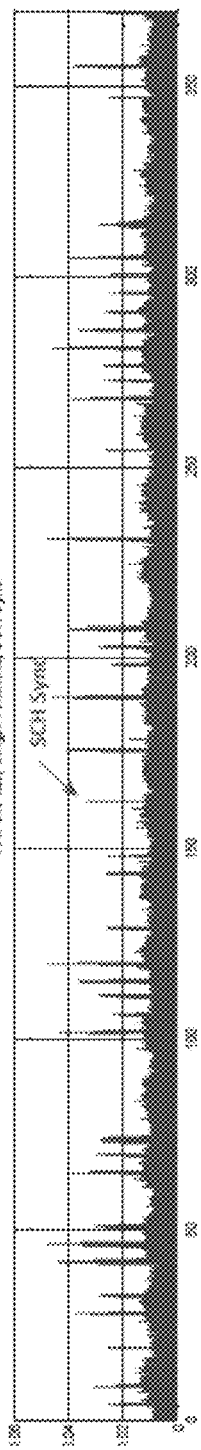
Figure 16A:
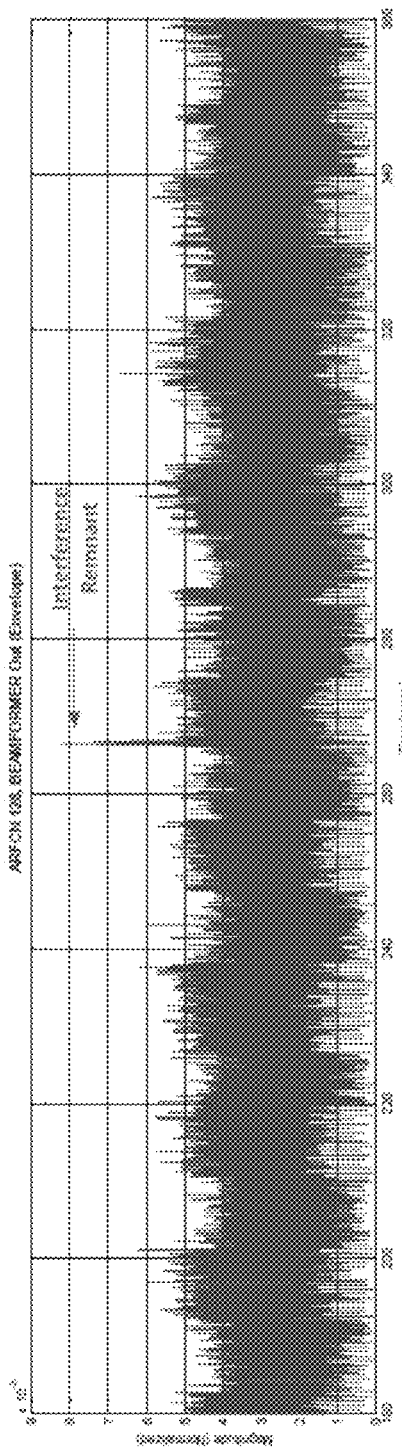
FIGS. 16a-16c illustrate a second channel synchronization output from a single antenna with WBS beamforming in according with an exemplary GSM signal test scenario.
Figure 16B:
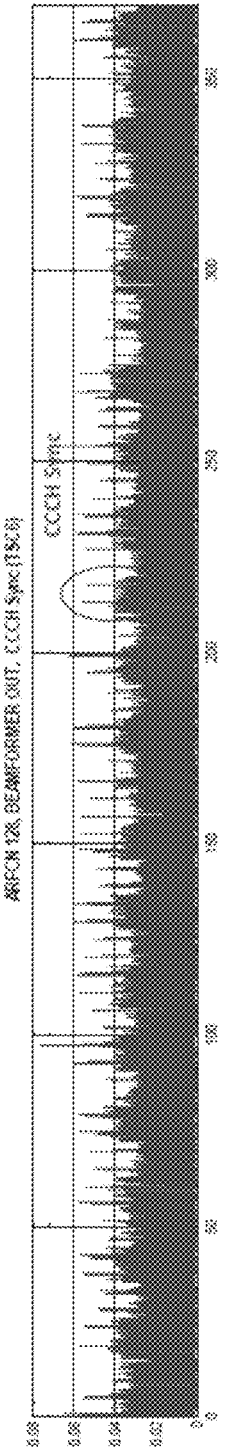
Figure 16C:
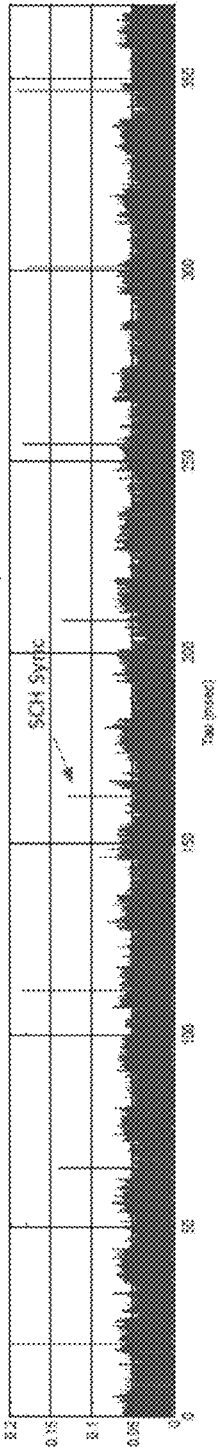

Further to the GSM example provided herein, FIGS. 14a-14b show output of the strongest signal, ARFCN 239 including Common Control Channel synchronization (CCCH Syncs) (FIG. 14a) and Synchronization Channel synchronization (SCH Sync) (FIG. 14b) without the modified WBS processing. Even without the WBS processing, the signals are well-defined. This is compared to the pre-WBS processing antenna outputs of the weak signal from ARFCN 128 illustrated in FIGS. 15a-15c. As shown in FIGS. 16a-16c, the most WBS beamforming signal results shown vast improvement, wherein Common Control Channel synchronization (CCCH Syncs) (FIG. 16b) and Synchronization Channel synchronization (SCH Sync) (FIG. 16c) are well-defined.

In concluding the detailed description, it should be noted that it would be obvious to those skilled in the art that many variations and modifications can be made to the embodiments without substantially departing from the principles described herein. Also, such variations and modifications are intended to be included herein within the scope as set forth in the appended claims.

It should be emphasized that the above-described embodiments are merely possible examples of the implementations, merely set forth for a clear understanding of the principles of thereof. Any variations and modifications may be made to the above-described embodiments of without departing substantially from the spirit of the principles of the embodiments. All such modifications and variations are intended to be included herein within the scope of the disclosure.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope thereof.

We claim:

1. A process for improving the quality of received radio frequency signals comprising:
receiving multiple tuned input signals at a subband adaptive filter, wherein the multiple tuned input signals are derived from multiple overlapping wideband radio frequency emitter signals emitted from multiple transmitters, decomposing by multiple channelizers the multiple tuned input signals into individual channel signals and providing individual channel signal data to a weighting algorithm module;
providing by the weighting algorithm module individualized weighted filter data for each of the individual channel signals in accordance with the individual channel signal data to an adaptive beamformer filter module;
supplying by the adaptive beamformer filter module the individualized weighted filter data to multiple subband beamformer combiners for application to each of the individual channel signals;
reconstructing by the subband adaptive filter the filtered individual channel signals and providing filtered individual channel output signals to a one or more receivers; and
receiving the filtered individual channel output signals at designated channels of the one or more receivers.

2. The process according to claim 1, wherein the individual channel signal data includes signal-of-interest (SOI) features and direction of arrival data.

3. The process according to claim 1, wherein reconstructing by the subband adaptive filtering module the filtered individual channel signals includes:
applying by the multiple subband beamformer combiners the received individualized weighted filter data;
combining by the multiple subband beamformer combiners subbands within each of the filtered individual channel signals; and
re-synthesizing by multiple synthesizers individual scalar channel signals from the multiple subband beamformer combiners.

4. The process according to claim 3, further comprising:
translating around in passband by the subband adaptive filter the individual scalar channel signals prior to re-synthesizing and outputting different emitter signals on multiple passbands.

5. The process according to claim 3, further comprising:
intercepting at an antenna array multiple overlapping wideband radio frequency emitter signals emitted from multiple transmitters; and
outputting by the antenna array multiple tuned input signals.

* * * * *